US008542420B2

(12) United States Patent
Ogawa et al.

(10) Patent No.: US 8,542,420 B2
(45) Date of Patent: Sep. 24, 2013

(54) IMAGE READING APPARATUS, IMAGE FORMING APPARATUS AND METHOD

(75) Inventors: Shogo Ogawa, Shizuoka (JP); Yoshio Yoshimura, Shizuoka (JP); Tadashi Mokudai, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 287 days.

(21) Appl. No.: 13/170,061

(22) Filed: Jun. 27, 2011

(65) Prior Publication Data
US 2012/0002254 A1 Jan. 5, 2012

Related U.S. Application Data

(60) Provisional application No. 61/360,447, filed on Jun. 30, 2010.

(51) Int. Cl.
| H04N 1/46 | (2006.01) |
| H04N 1/407 | (2006.01) |
| H04N 1/04 | (2006.01) |
| H04N 1/40 | (2006.01) |
| G03F 3/08 | (2006.01) |
| G06K 15/00 | (2006.01) |
| G06K 1/00 | (2006.01) |
| G06K 9/32 | (2006.01) |
| G06F 3/12 | (2006.01) |
| G03G 15/01 | (2006.01) |
| A61B 1/04 | (2006.01) |
| H02P 7/285 | (2006.01) |

(52) U.S. Cl.
USPC ........... 358/513; 358/518; 358/2.1; 358/1.13; 358/3.26; 358/475; 358/505; 358/1.9; 358/474; 358/3.24; 382/294; 399/301; 348/71; 348/645; 348/692; 388/816

(58) Field of Classification Search
USPC ............... 358/513, 518, 2.1, 1.13, 3.26, 475, 358/505, 1.9, 474, 3.24; 382/294; 399/301; 348/71, 645, 692; 388/816
See application file for complete search history.

(56) References Cited

U.S. PATENT DOCUMENTS

| 3,851,236 A | * | 11/1974 | Dennhardt et al. | 388/816 |
| 5,010,395 A | * | 4/1991 | Tsuji et al. | 348/71 |
| 6,765,206 B2 | * | 7/2004 | Sugiyama et al. | 250/330 |
| 7,595,812 B2 | * | 9/2009 | Maeda | 347/234 |
| 2003/0048958 A1 | * | 3/2003 | Ishiguro | 382/261 |
| 2003/0132384 A1 | * | 7/2003 | Sugiyama et al. | 250/330 |
| 2003/0202193 A1 | * | 10/2003 | Yokochi | 358/1.9 |

(Continued)

Primary Examiner — Charlotte M Baker
Assistant Examiner — Rury Grisham
(74) Attorney, Agent, or Firm — Patterson & Sheridan, L.L.P.

(57) ABSTRACT

Certain embodiments provide an image reading apparatus including: a monochrome CCD sensor including a first photodiode array; plural color CCD sensors each including a second photodiode array; an AD converter configured to apply analog-to-digital conversion to each of analog outputs from the second photodiode array and the first photodiode array; a delay processing unit configured to delay at least one of color image data of plural colors from the AD converter and interpolate, with delayed any one or more of the color image data, a blank of image data that is to be read on a line in a sub-scanning direction; and an inter-line correction unit configured to correct, by the intervals and a set reduction magnification, a positional deviation in the sub-scanning direction between the monochrome image data and the color image data, respective timings of which are aligned on the line by the delay processing unit.

20 Claims, 31 Drawing Sheets

(56) References Cited

U.S. PATENT DOCUMENTS

| | | | |
|---|---|---|---|
| 2004/0174568 A1* | 9/2004 | Murakami | 358/2.1 |
| 2006/0082846 A1* | 4/2006 | Sakakibara et al. | 358/518 |
| 2006/0164505 A1* | 7/2006 | Maeda | 347/234 |
| 2006/0279748 A1* | 12/2006 | Kamisuwa | 358/1.2 |
| 2008/0187244 A1* | 8/2008 | Shoda | 382/294 |
| 2010/0220370 A1* | 9/2010 | Ueno et al. | 358/475 |
| 2011/0013241 A1* | 1/2011 | Ohara | 358/518 |
| 2012/0062965 A1* | 3/2012 | Naya | 358/505 |

* cited by examiner

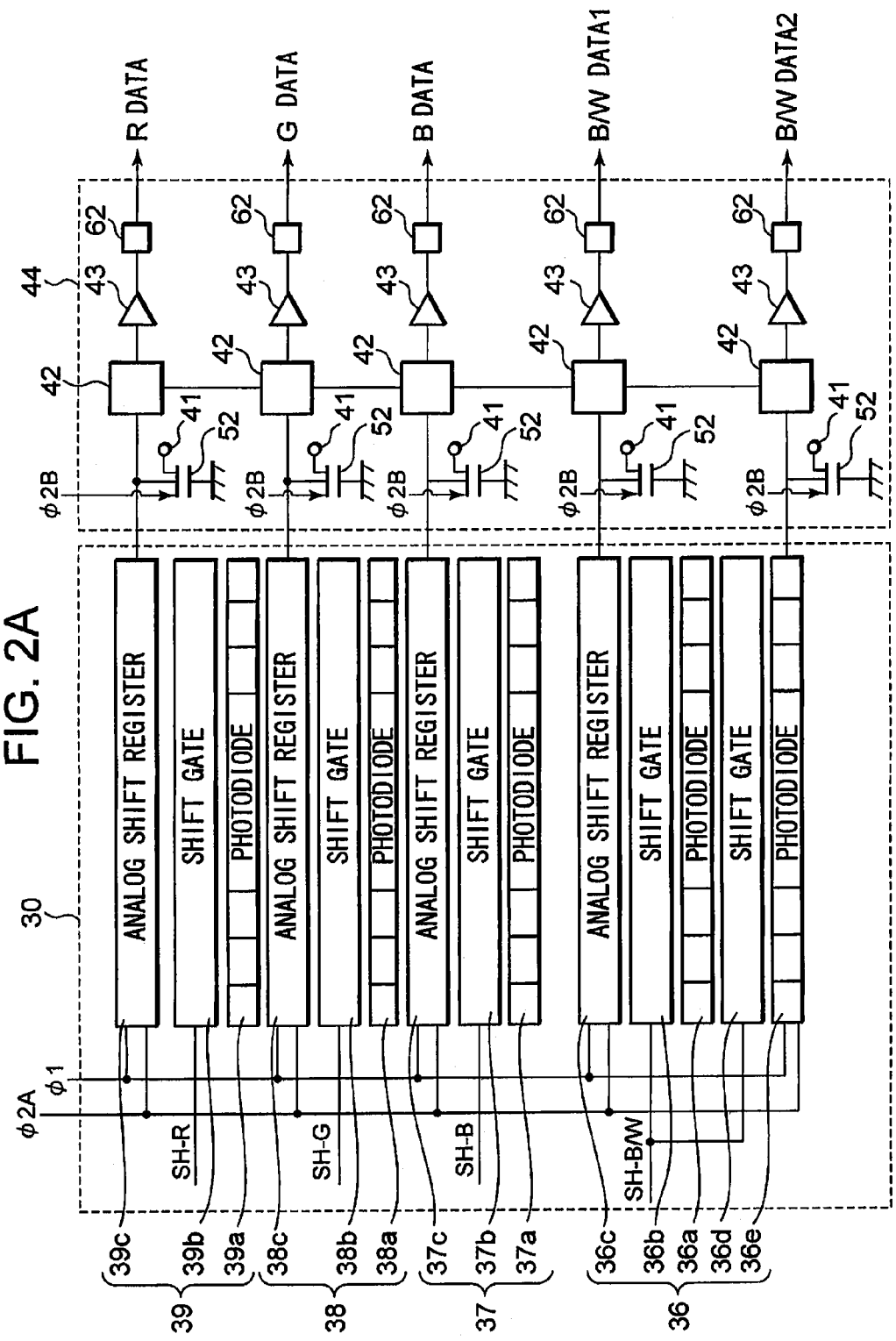

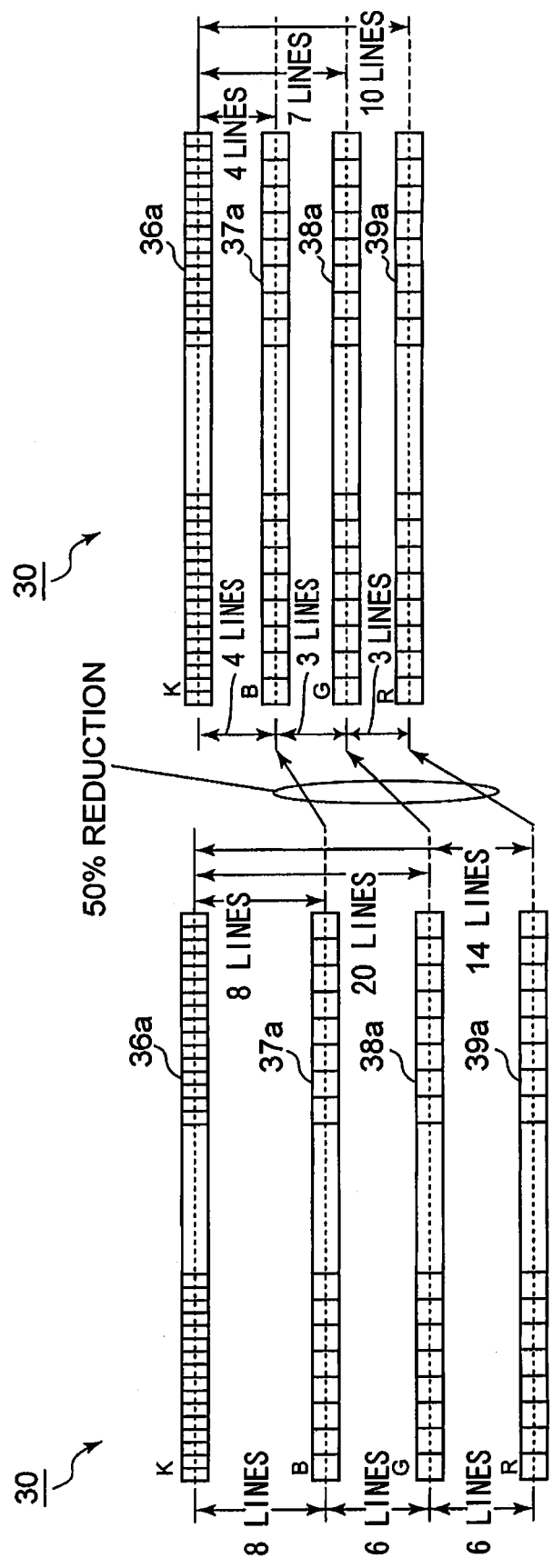

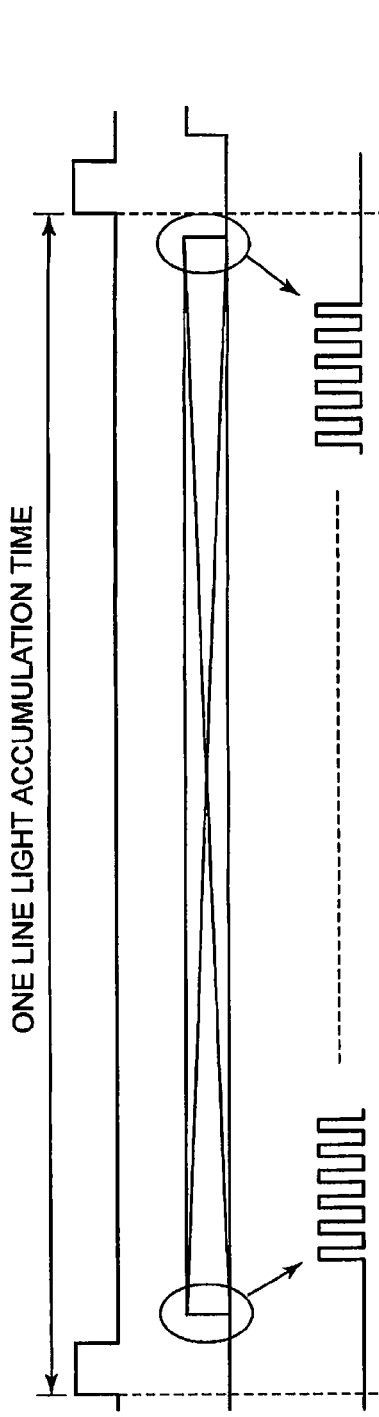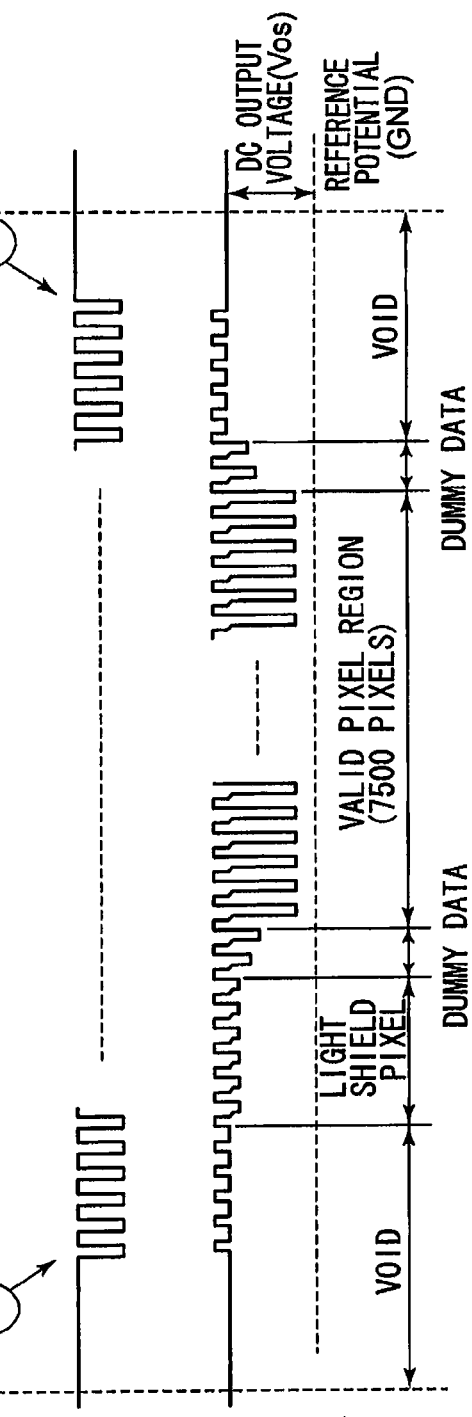

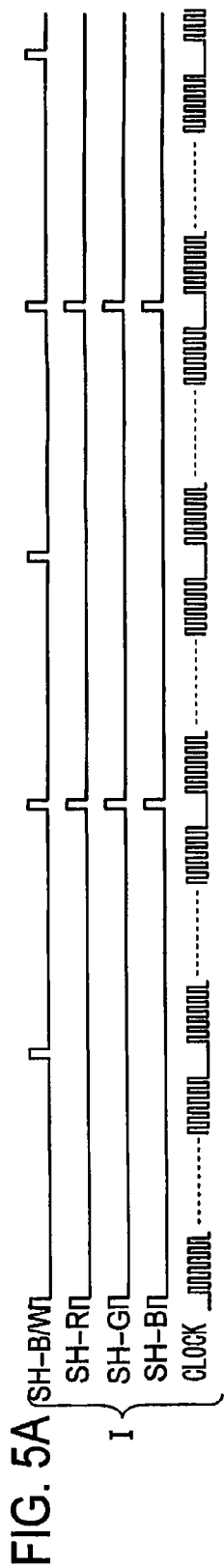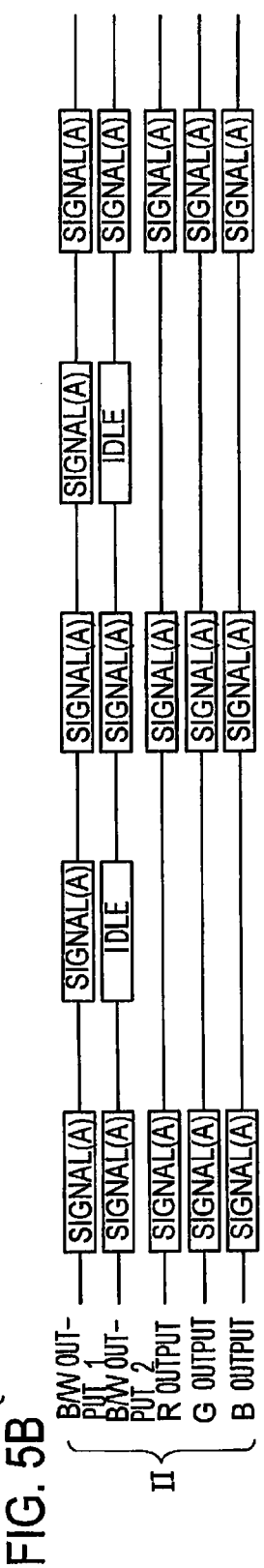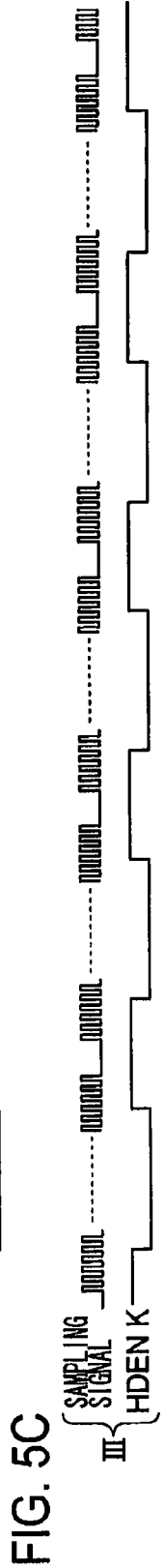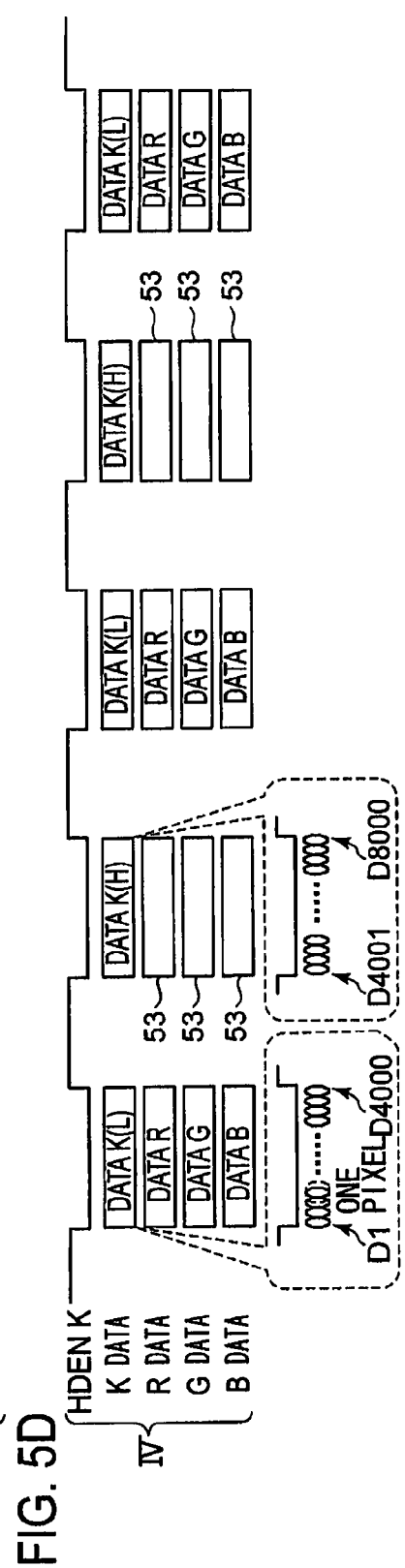

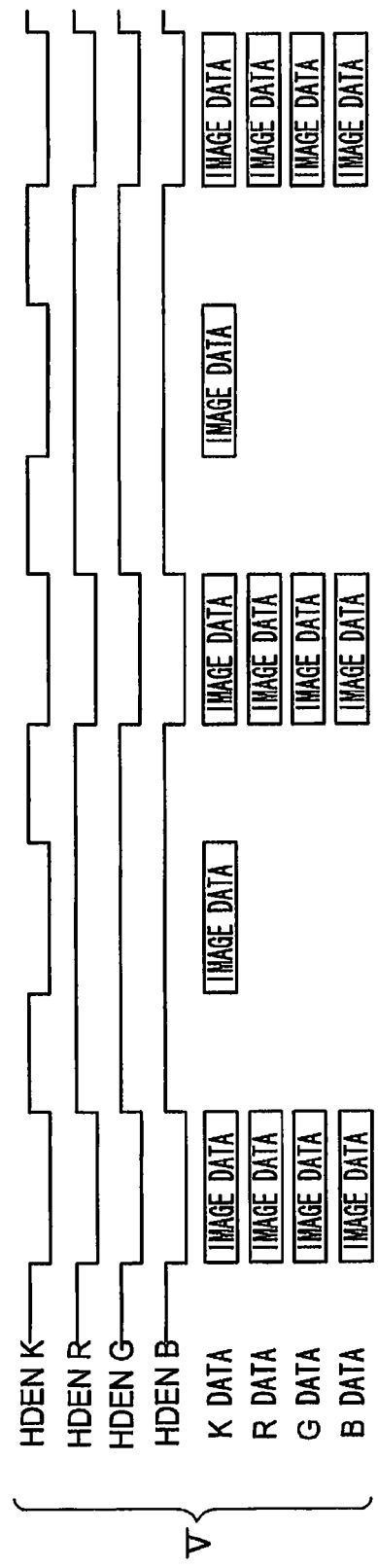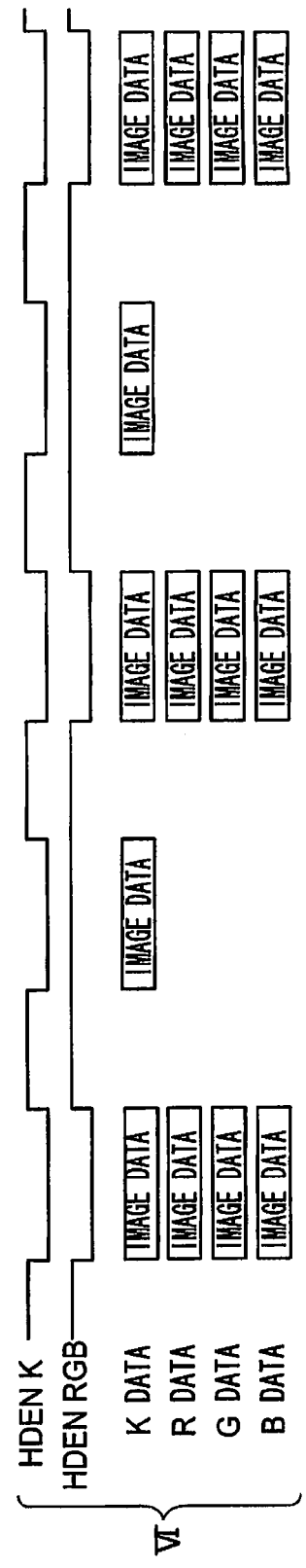

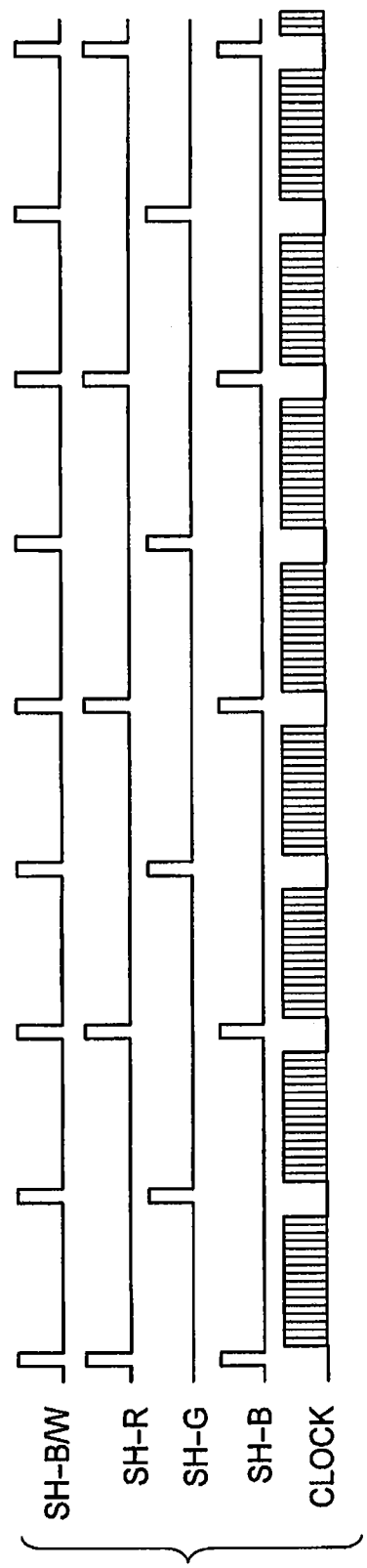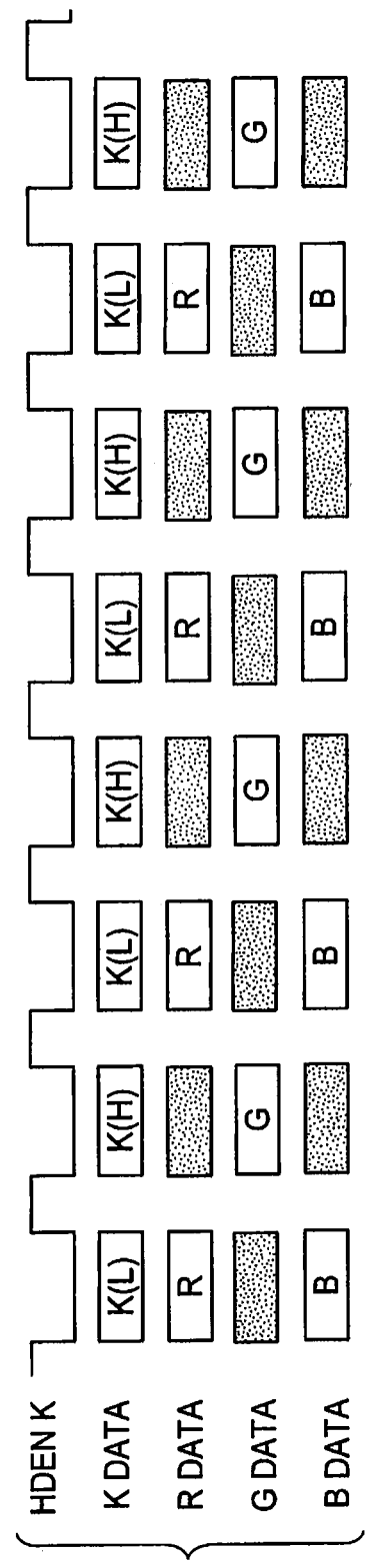

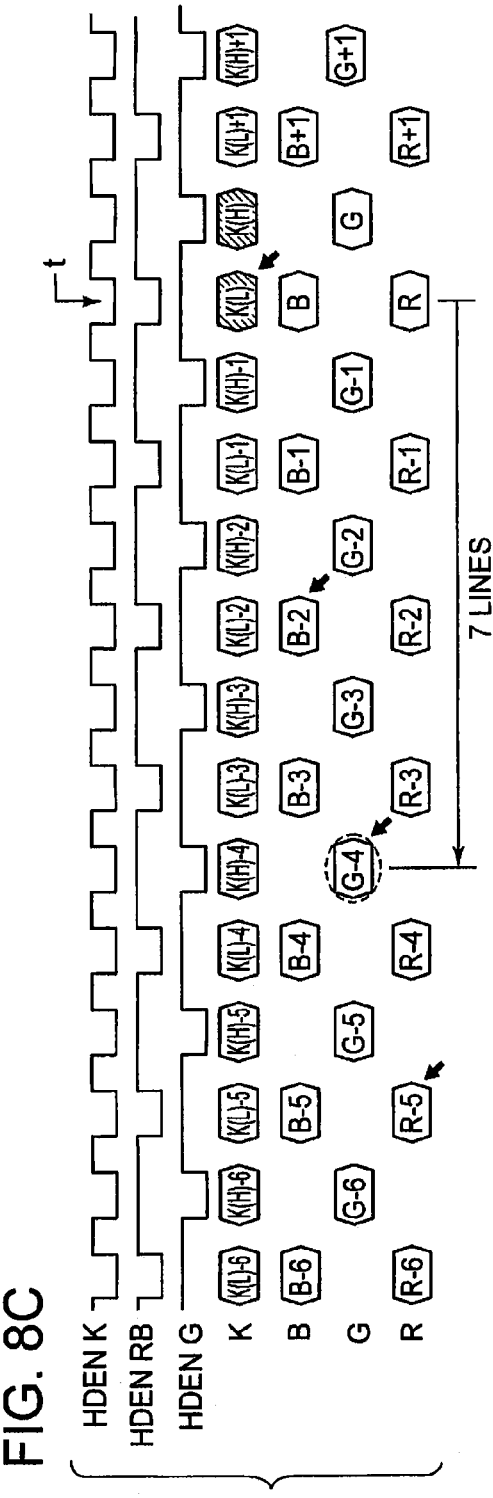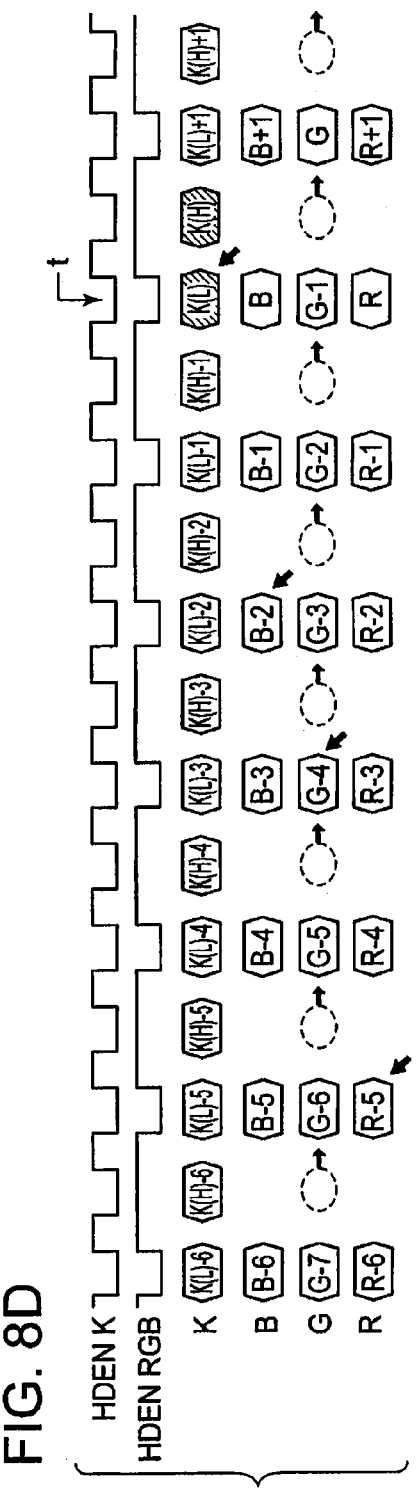
FIG. 8C
FIG. 8D

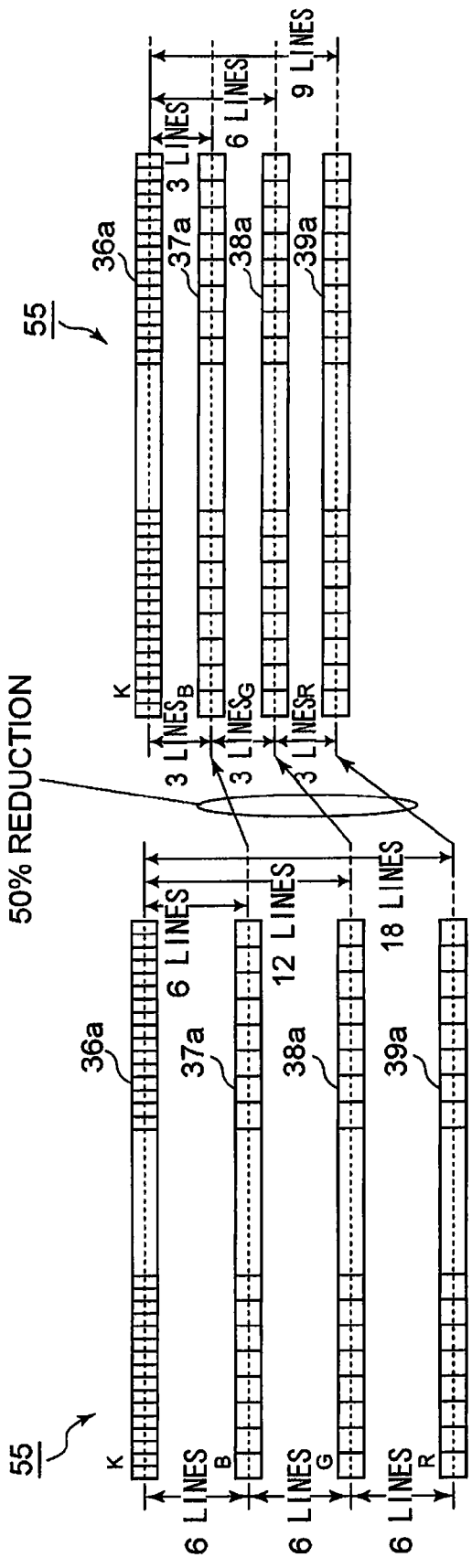

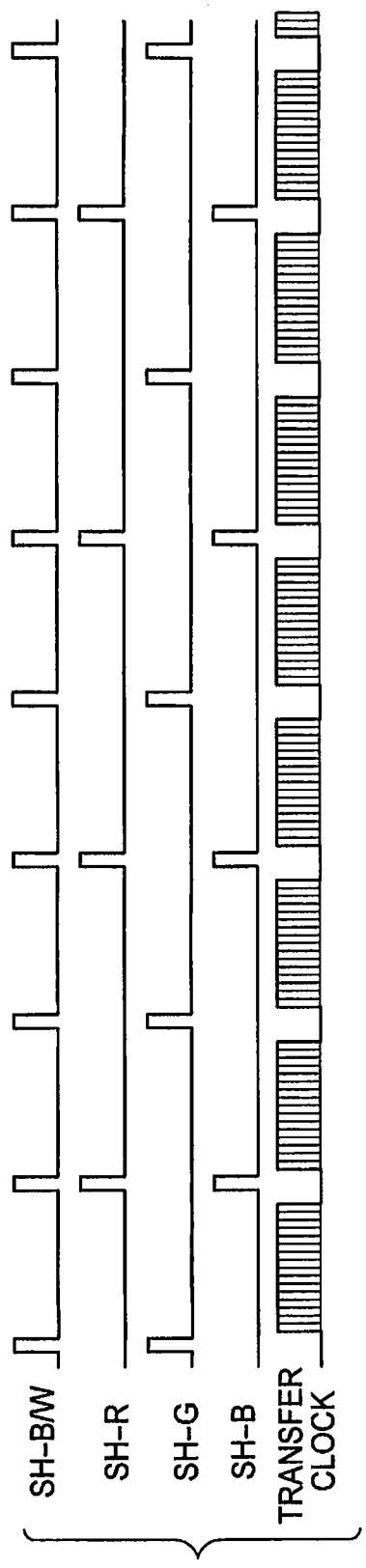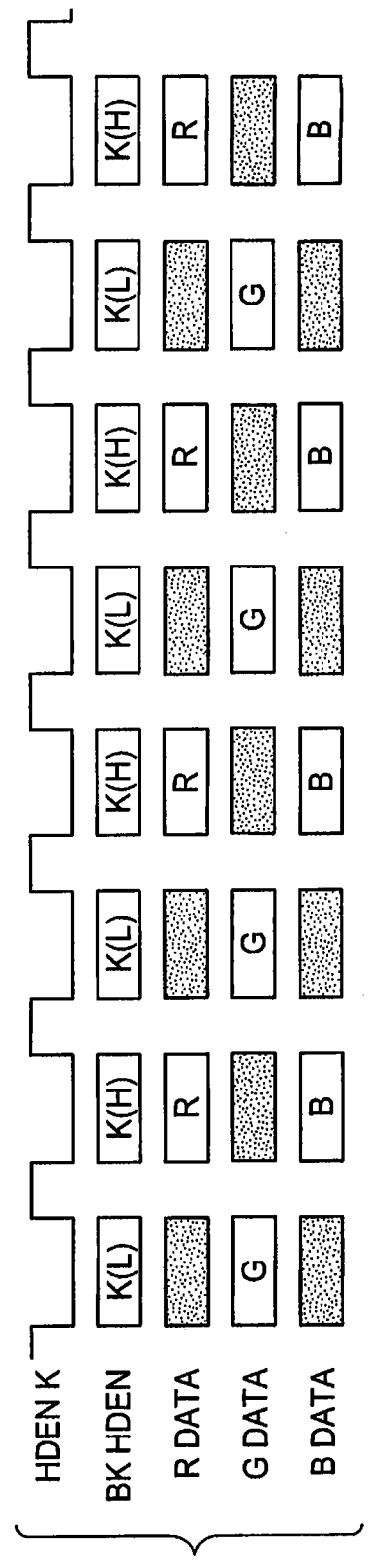

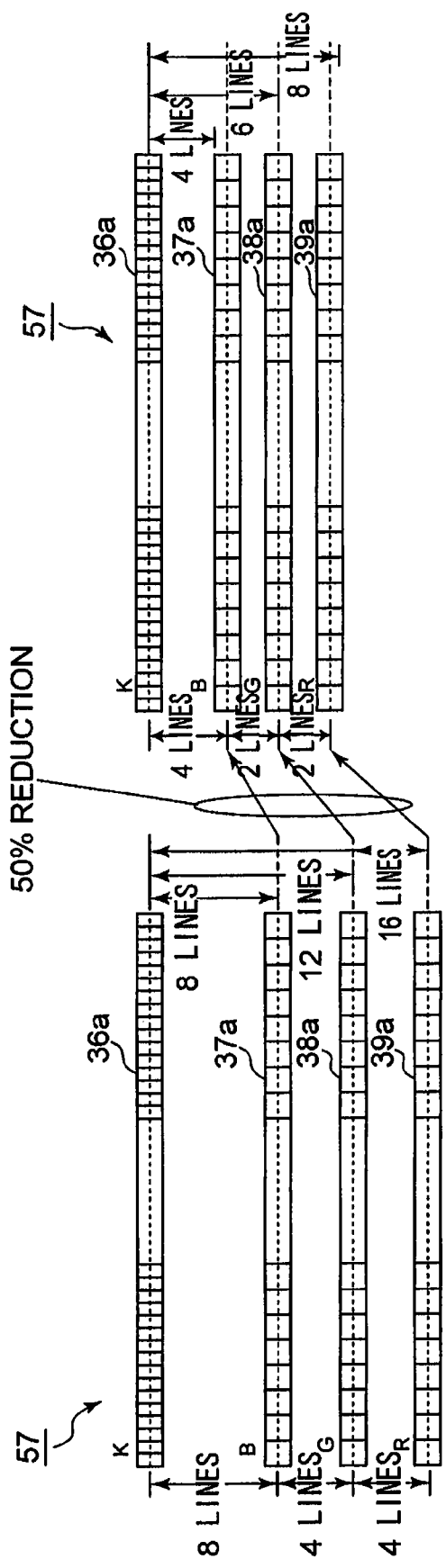

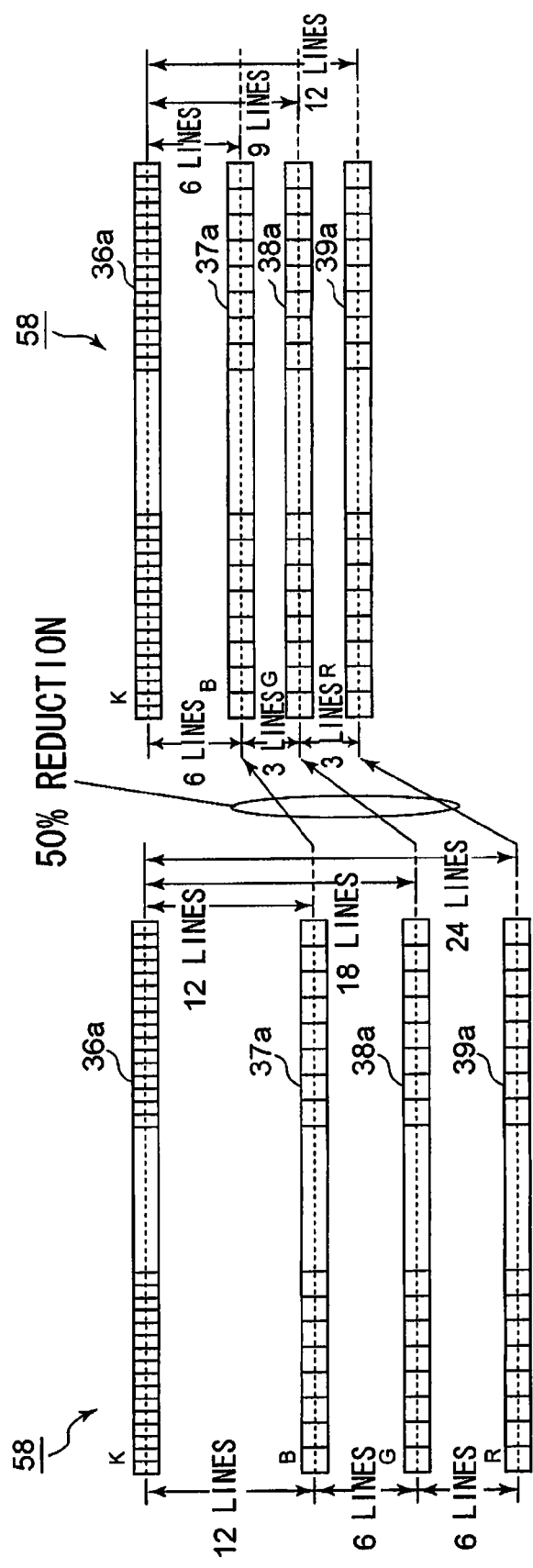

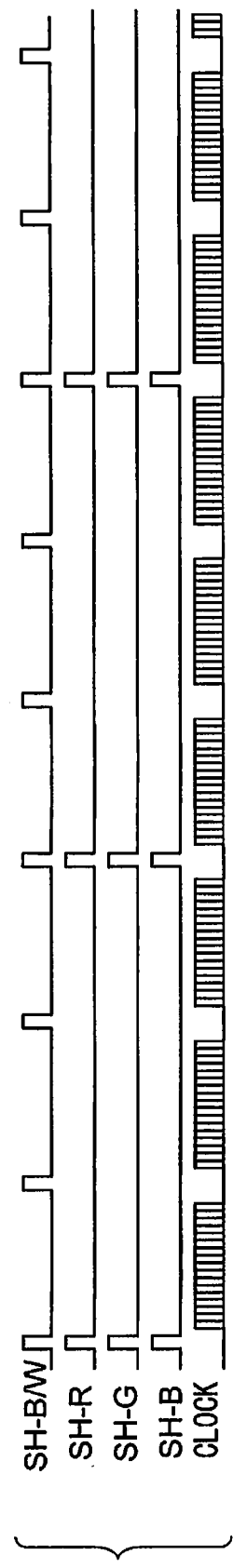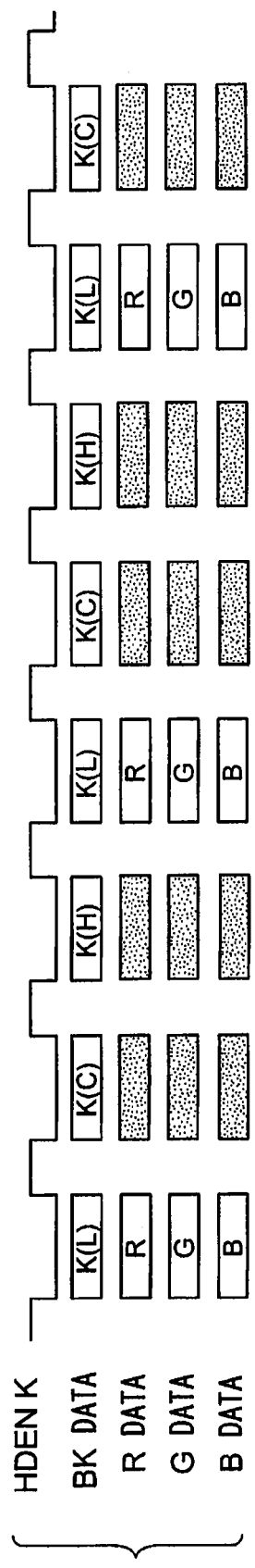

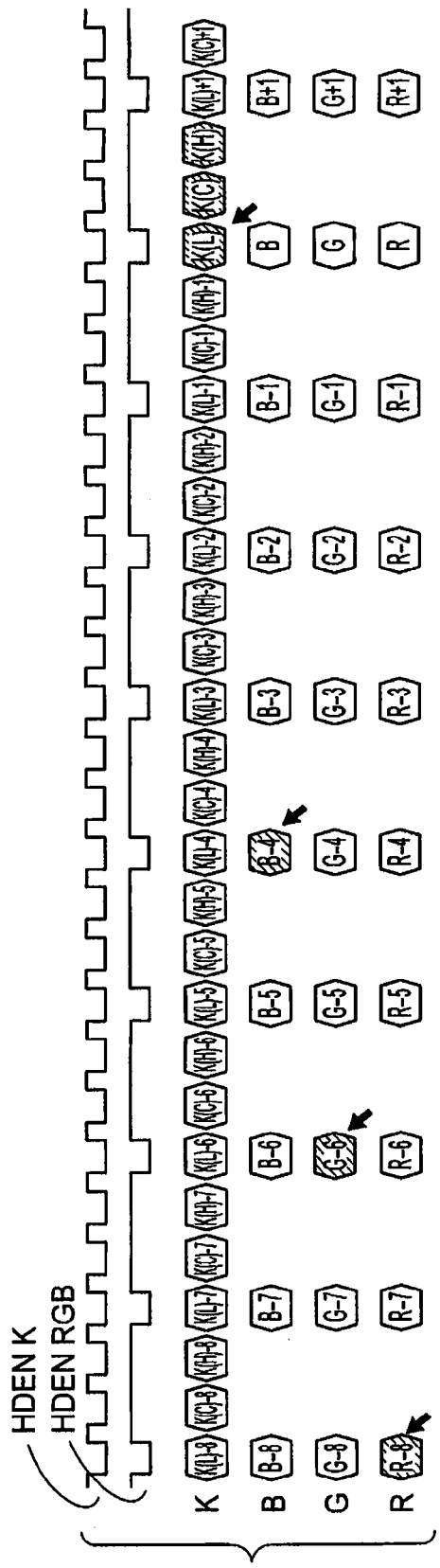
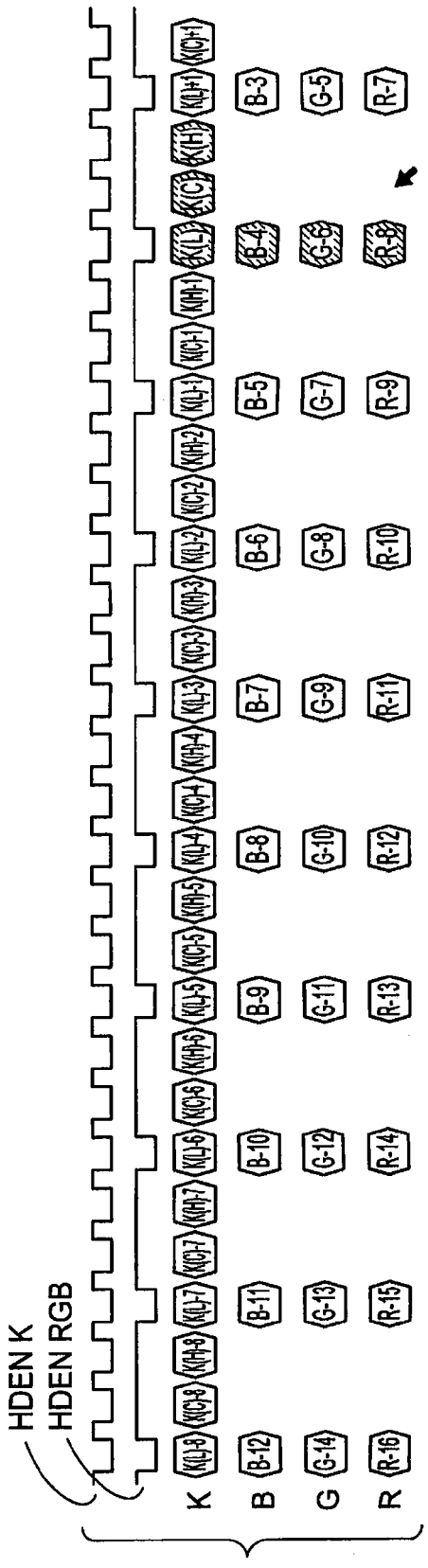
FIG. 16A
FIG. 16B

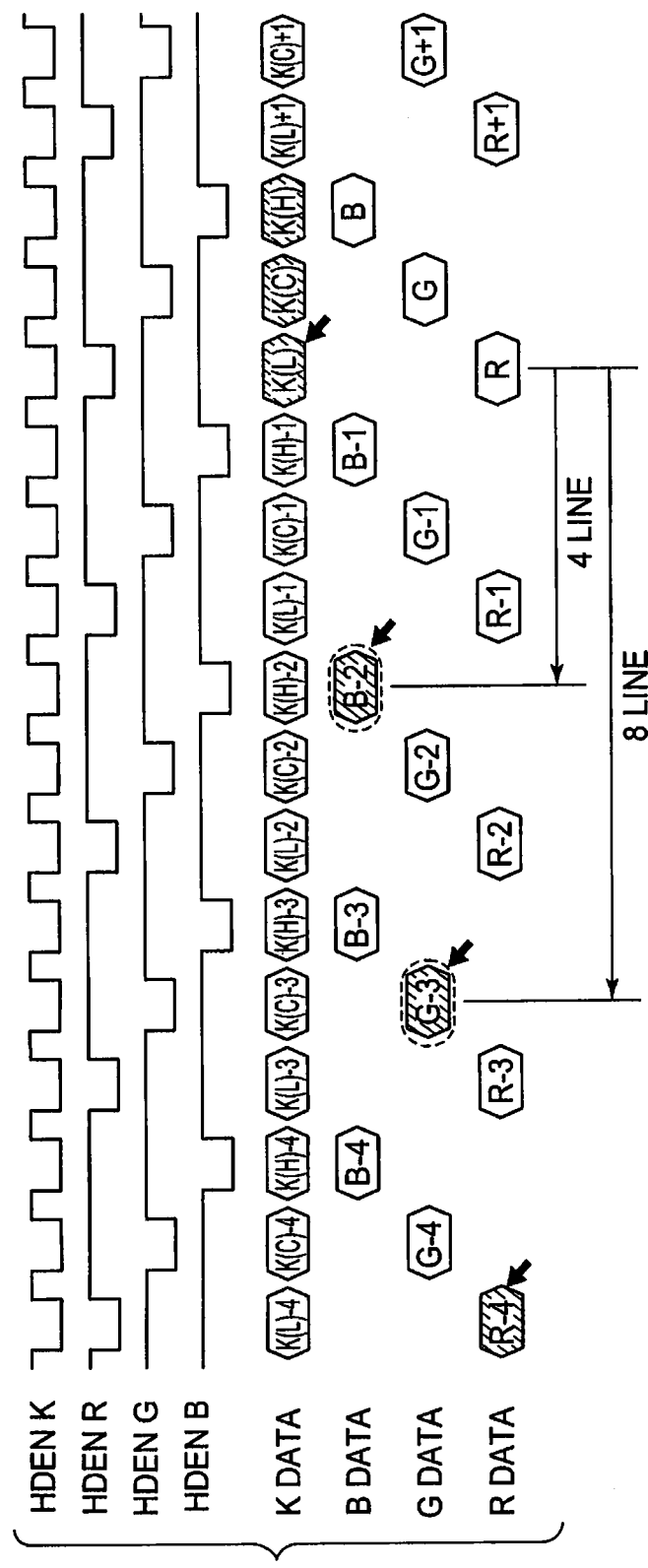

IMAGE READING APPARATUS, IMAGE FORMING APPARATUS AND METHOD

CROSS-REFERENCE TO RELATED APPLICATION

The present application claims priority under 35 U.S.C. 119 to U.S. Provisional Application Ser. No. 61/360,447, filed on Jun. 30, 2010, the entire disclosure of which is incorporated herein by reference.

FIELD

Embodiments described herein relate generally to, an image reading apparatus, an image forming apparatus, and an image reading method.

BACKGROUND

A four-line CCD (charge coupled device) sensor includes one monochrome CCD sensor and CCD sensors respectively for RGB. Each of the CCD sensors includes a photodiode array.

The number of photodiodes (photodiode elements) is the same among the four colors. This is equivalent to the fact that the resolution of the monochrome CCD sensor and the resolution of the color CCD sensors for the three colors are the same. The resolution indicates dpi (dot per inch).

An image reading apparatus according to a related art controls reading according to sample hold signals at the same timing among R, G, B, and K. The image reading apparatus is capable of controlling image data of R, G, B, and K using the same image enable signal.

If the image reading apparatus according to the related art includes a four-line CCD sensor of a hybrid type, in some cases, reading control for image data is complicated depending on line intervals of the four-line CCD sensor.

The CCD sensor of the hybrid type indicates a CCD sensor in which the resolution of a monochrome line and the resolution of color three lines are different. The line indicates a row of pixels for four colors.

For example, the four-line CCD sensor has line intervals: six lines between R pixels and G pixels, six lines between the G pixels and B pixels, and eight lines between the B pixels and K pixels. It is assumed that the four-line CCD sensor executes 50% reading.

The image reading apparatus according to the related art cannot read out a monochrome pixel on certain one line and color pixels on the line at the same timing. The image reading apparatus cannot execute inter-line correction in a state in which pixel data of four rows are aligned on the same line.

If the image reading apparatus performs reading at a reduction magnification with the four-line CCD sensor of the hybrid type, the image reading apparatus needs to generate a sample hold signal for R and B and a sample hold signal for G at different timings.

In shading correction performed by using the sample hold signals at the different timings, the image reading apparatus needs to perform control using an image enable signal for R and B and an image enable signal for G which is different from the image enable signal for R and B. The control is complicated.

In the image reading apparatus including the four-line CCD sensor of the hybrid type, it requires complicated control to read out pixel data of four lines at the same timing.

BRIEF DESCRIPTION OF THE DRAWINGS

FIG. 2A is a diagram of a configuration example of a CCD sensor used in an image reading apparatus according to the first embodiment;

FIG. 2B is a diagram of a line interval example of the CCD sensor used in the image reading apparatus according to the first embodiment;

FIG. 2C is a diagram of intervals of four lines at a magnification 50% by the CCD sensor shown in FIG. 2B;

FIGS. 4A to 4F are time charts for explaining an example of a sample hold signal and transfer clocks used in the image reading apparatus according to the first embodiment;

FIGS. 5A to 5H are time charts for explaining basic timings of the operations of the signal processing device and the CCD sensor used in the image reading apparatus according to the first embodiment;

FIG. 8A is a time chart of an output I during the 50% reduction reading;

FIG. 8B is a time chart of an output IV at the time when the CCD sensor is driven at timing shown in FIG. 8A;

FIG. 8C is a time chart of image data before the inter-line correction processing at the timing shown in FIG. 8A;

FIG. 8D is a time chart of image data before the inter-line correction processing during the 50% reduction reading;

FIG. 9A is a diagram of a configuration example of a CCD sensor in which line intervals are 6-6-6;

FIG. 9B is a diagram of intervals of four lines at a magnification 50% by the CCD sensor shown in FIG. 9A;

FIG. 11A is a time chart of the output I during the 50% reduction reading;

FIG. 11B is a time chart of an output IV at the time when the CCD sensor is driven at timing shown in FIG. 11A;

FIG. 12A is a diagram of a configuration example of a CCD sensor in which line intervals are 4-4-8;

FIG. 12B is a diagram of intervals of four lines at a magnification 50% by the CCD sensor shown in FIG. 12A;

FIG. 14A is a diagram of a line interval example of a CCD sensor used in an image reading apparatus according to a second embodiment;

FIG. 14B is a diagram of intervals of four lines at a magnification 50% by the CCD sensor shown in FIG. 14A;

FIG. 15A is a time chart of an output I from a timing generator to a CCD sensor;

FIG. 15B is a time chart of an output IV at the time when the CCD sensor is driven at timing shown in FIG. 15A;

FIG. 16A is a time chart of image data before inter-line correction processing during normal reading;

FIG. 16B is a time chart of image data after the inter-line correction processing during the normal reading;

FIG. 19C is a time chart of image data before the inter-line correction processing during the 50% reduction reading;

DETAILED DESCRIPTION

Figure 1:
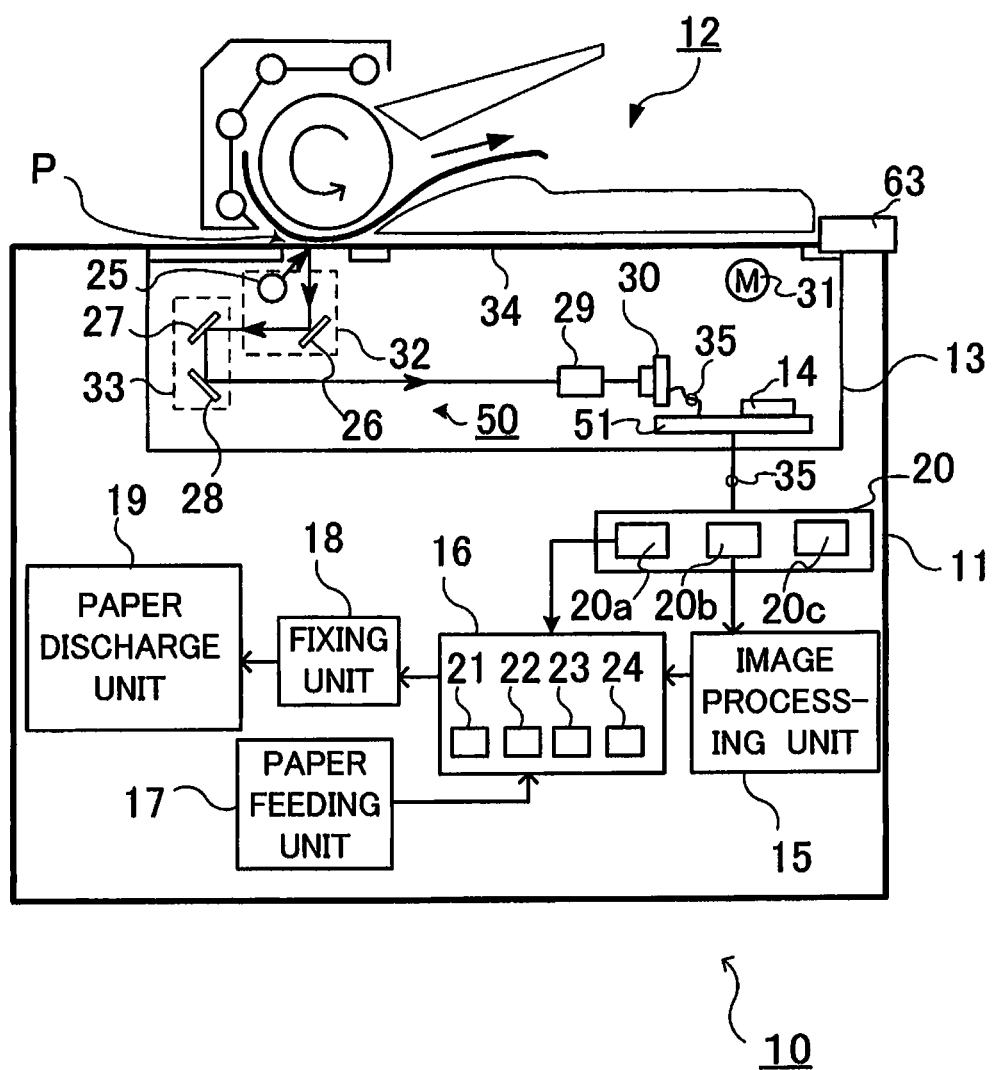
FIG. 1 is a diagram of an image forming apparatus according to a first embodiment.

Certain embodiments provide an image reading apparatus including: a monochrome CCD sensor provided along a main scanning direction and including a first photo-diode array configured to photoelectrically convert a light image of reflected light reflected from a document surface; plural color CCD sensors each provided along the main scanning direction at a physical interval apart from the monochrome CCD sensor in a sub-scanning direction and including a second photodiode array configured to photoelectrically convert the light image; an AD converter configured to apply analog-to-digital conversion to each of analog outputs from the second photodiode array of each of the color CCD sensors and the first photodiode array of the monochrome CCD sensor; a delay processing unit configured to delay at least one of color image data of plural colors output by the AD converter and interpolate, with delayed any one or more of the color image data, a blank of image data that is to be read on a line in the sub-scanning direction; and an inter-line correction unit configured to correct, by the intervals and a set reduction magnification, a positional deviation in the sub-scanning direction between the monochrome image data and the color image data of the plural colors, respective timings of which are aligned on the line by the delay processing unit.

An image reading apparatus, an image forming apparatus, and an image reading method are explained in detail below with reference to the accompanying drawings as examples. In the figures, the same components are denoted by the same reference numerals and signs and redundant explanation is omitted.

First Embodiment

An image reading apparatus according to a first embodiment is a scanner including a four-line CCD.

An image forming apparatus according to the first embodiment is an MFP.

An image reading method according to the first embodiment is a method of reading image data with a four-line CCD in which the resolution of a monochrome line and the resolution of color three lines are different.

FIG. 1 is a diagram of the MFP. An MFP 10 (an image forming apparatus) includes a housing 11, a document input unit 12, a scanner 13 (an image reading apparatus), and a signal processing device 14 in the scanner 13.

The MFP 10 includes an image processing unit 15, a printing process unit 16, a paper feeding unit 17, a fixing unit 18, a paper discharge unit 19, and a main control unit 20.

The document input unit 12 is an ADF (Automatic Document Feeder) configured to convey an original document to a reading position P and press the original document against the surface of a glass plate 34.

The scanner 13 optically scans a document surface. The scanner 13 generates light reception signals of four colors.

The signal processing device 14 executes signal processing on an analog light reception signal from the scanner 13. The signal processing device 14 executes AD conversion, delay of image data of any one of RGB, shading correction, and inter-line correction.

The image processing unit 15 converts image data of R, G, B, and K from the signal processing device 14 into printing colors of Y, M, C, and K.

The printing process unit 16 prints an image on a sheet. The printing process unit 16 includes an image forming unit 21 for yellow, an image forming unit 22 for magenta, an image forming unit 23 for cyan, and an image forming unit 24 for black.

The image forming unit 21 includes a photoconductive drum, a charging unit, a laser exposing unit, a developing unit, and a transfer unit. The configurations of the image forming unit 22, the image forming unit 23, and the image forming unit 24 are substantially the same as the configuration of the image forming unit 21.

The paper feeding unit 17 feeds a sheet to the printing process unit 16. The fixing unit 18 fixes toner images of four colors on the sheet. The paper discharge unit 19 discharges the sheet, which is pressed and heated by the fixing unit 18, from the housing 11.

The main control unit 20 sets the magnification of an image of the scanner 13. The magnification includes non-magnification, reduction, and enlargement. The main control unit 20 sets the magnification of the scanner 13 according to an input to an operation panel 63.

The main control unit 20 converts the resolution of color image data of three colors and the resolution of monochrome image data. The main control unit 20 changes scanning speeds in a sub-scanning direction and a main scanning direction according to a driving signal supplied to a motor 31.

The main control unit 20 stores image data read by the scanner 13. The main control unit 20 includes a CPU (central processing unit) 20a, a ROM (read only memory) 20b, and a RAM (random access memory) 20c.

The CPU 20a manages control of reading of an original document in the document input unit 12 and the scanner 13 and control of the operation of the printing process unit 16. The ROM 20b stores a control program for image reading. The RAM 20c stores image data for each page.

The scanner 13 is explained below. The scanner 13 includes an optical system 50 and a CCD sensor 30.

The optical system 50 illuminates a document surface, scans the document surface in the main scanning direction and the sub-scanning direction respectively at main conveyance speed and sub-conveyance speed, and generates a light image. The optical system 50 outputs a light image having size corresponding to an image magnification.

The optical system 50 includes a light source 25, mirrors 26, 27, and 28, a lens 29, the CCD sensor 30, and the motor 31.

The light source 25 generates light to be irradiated on an original document. The mirror 26 leads reflected light reflected by the original document to the mirror 27. The mirror 27 leads reflected light reflected by the mirror 26 to the mirror 28.

The scanner 13 includes a first carriage 32 and a second carriage 33 below the glass plate 34. The carriage 32 moves the mirror 26 with driving force from the motor 31. The carriage 33 moves the mirrors 27 and 28 with the driving force.

The carriages 32 and 33 move in parallel to the plate surface of the glass plate 34. According to the movement of the carriages 32 and 33, a reading position P for the original document moves from the left to the right. The moving direction of the carriages 32 and 33 is the sub-scanning direction of the original document.

The mirror 28 leads reflected light reflected by the mirror 27 to the lens 29. The lens 29 collects reflected light reflected by the mirror 28. The lens 29 focuses a light beam on the surface of the CCD sensor 30.

The CCD sensor 30 outputs a monochrome image signal and color image signals of RGB to the signal processing device 14 through a harness 35. The CCD sensor 30 includes four rows of line sensors on a control board 51.

FIG. 2A is a diagram of a configuration example of the CCD sensor 30. An analog pre-stage processing unit 44 is also shown in the figure. The reference numerals and signs already described above denote components same as the components denoted by the reference numerals and signs.

The CCD sensor 30 includes K line sensor 36 for black and white, a B line sensor 37 for B (blue), a G line sensor 38 for G (green), and an R line sensor 39 for R (red).

The K line sensor 36, the B line sensor 37, the G line sensor 38, and the R line sensor 39 respectively photoelectrically convert light images output from the optical system 50.

The K line sensor 36 includes a photodiode array 36a, shift gates 36b and 36d, and analog shift registers 36c and 36e.

The photodiode array 36a includes plural photodiodes each configured to output a photocurrent. An arraying direction of the plural photodiodes is along the main scanning direction.

The shift gates 36b and 36d are electrodes configured to respectively transfer charges separately from odd-number-th and even-number-th photodiodes among all the photodiodes. The shift gates 36b and 36d respectively transfer the charges sampled according to a sample hold signal SH-B/W to the analog shift registers 36c and 36e.

The analog shift registers 36c and 36e respectively receive the transfer of the charges from the shift gates 36b and 36d in parallel.

The analog shift registers 36c and 36e serially move the charges held by resister cells to rearmost register cells according to a transfer clock.

As an example, the analog shift register 36c has a gate structure of a MOS structure that crosses a row electrode of the shift gate 36b. The analog shift register 36c separately reads out, as signal charges, the charges after photoelectric conversion using the gate structure. The analog shift register 36e is the same as the analog shift register 36c.

The K line sensor 36 includes a capacitor 52 on the output side of the analog shift registers 36c and 36e. The capacitor 52 converts the transferred charges into a voltage according to a transfer clock φ2B.

The B line sensor 37 includes a photodiode array 37a, a shift gate 37b, and an analog shift register 37c.

The photodiode array 37a includes plural photodiodes and optical filters provided on the respective photodiodes and configured to transmit light having a wavelength component of blue. The number of elements of the photodiode array 37a is a half of the number of elements of the photodiode array 36a.

The shift gate 37b is an electrode configured to separately transfer the charges from the photodiodes of the photodiode array 37a. The shift gate 37b transfers the charges sampled according to a sample hold signal SH-B to the analog shift register 37c.

The analog shift register 37c serially moves the charges held by register cells to output side register cells according to a transfer clock.

The G line sensor 38 includes a photodiode array 38a, a shift gate 38b, and an analog shift register 38c.

The R line sensor 39 includes a photodiode array 39a, a shift gate 39b, and an analog shift register 39c.

The configurations of the shift gates 38b and 39b are substantially the same as the configuration of the shift gate 37b. The configurations of the analog shift registers 38c and 39c are substantially the same as the configuration of the analog shift register 37c.

All of the B line sensor 37, the G line sensor 38, and the R line sensor 39 include capacitors 52 on the output side.

A pixel pitch in the main scanning direction of the photodiodes of the K line sensor 36 is smaller than a pixel pitch in the main scanning direction of the photodiodes of the B line sensor 37, the G line sensor 38, and the R line sensor 39.

The resolution in the main scanning direction of the K line sensor 36 is twice as large as the resolution in the main scanning direction of each of the R line sensor 39, the G line sensor 38, and the B line sensor 37.

The CCD sensor 30 holds the K line sensor 36, the B line sensor 37, the G line sensor 38, and the R line sensor 39 with the photodiode arrays 36a, 37a, 38a, and 39a set such that the lines are parallel to one another.

As an example, the CCD sensor 30 includes the K line sensor 36 closer to the rear surface of the glass plate 34 (upper in FIG. 1). On an original document, first, the K line sensor 36 reads a monochrome image in a direction from the leading end to the trailing end of the original document.

FIG. 2B is a diagram of an example of line intervals of the CCD sensor 30. The reference numerals and signs already described above denote components same as the components denoted by the reference numerals and signs. The physical arrangement of the four lines is 6-6-8. 6-6-8 means that line intervals between R and G, between G and B, and between B and K are physically 6, 6, and 8, respectively (the same holds true in examples explained below).

The CCD sensor 30 includes the B line sensor 37 an interval of eight lines apart from the K line sensor 36 in the sub-scanning direction.

The CCD sensor 30 includes the G line sensor 38 an interval of fourteen lines apart from the K line sensor 36 in the sub-scanning direction.

The CCD sensor 30 includes the R line sensor 39 an interval of twenty lines apart from the K line sensor 36 in the sub-scanning direction.

FIG. 2C is a diagram of intervals of four lines at a magnification 50% by the CCD sensor 30 shown in FIG. 2B. During processing of reduction printing at 50% or the like, as shown in FIG. 2C, the signal processing device 14 reduces line intervals on data.

Figure 3:
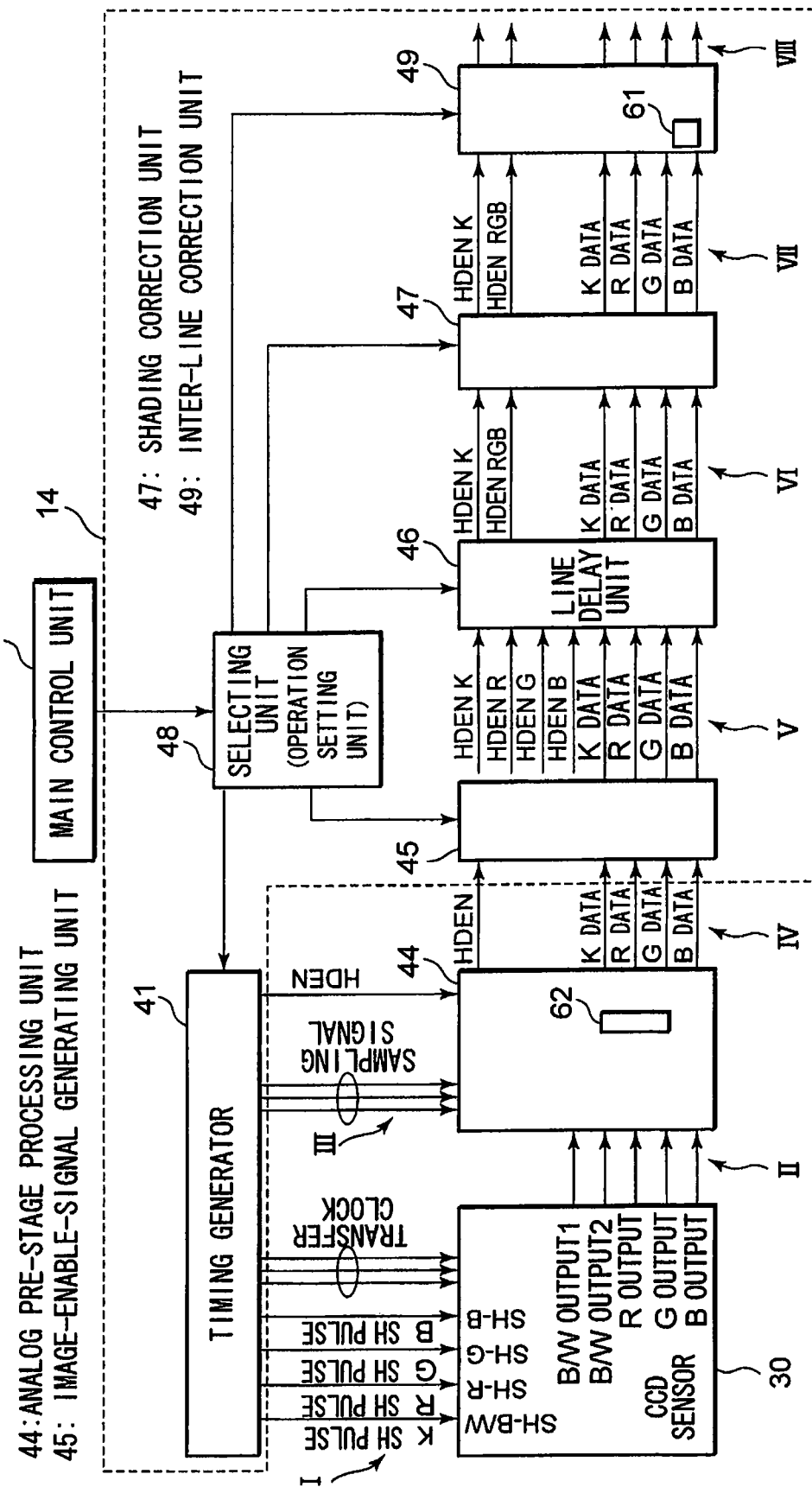
FIG. 3 is a block diagram of a signal processing device used in the image reading apparatus according to the first embodiment.

FIG. 3 is a block diagram of the signal processing device 14. The CCD sensor 30 is also shown in the figure. The signal processing device 14 is an LSI (large scale integration) on the control board 51.

The signal processing device 14 includes a timing generator 41 (a clock generating unit) configured to generate a clock signal and a control signal.

The timing generator 41 generates transfer clocks φ1, φ2A, and φ2B and sample hold signals SH-R, SH-G, SH-B, and SH-B/W.

The timing generator 41 drives a photodiode array for monochrome and photodiode arrays of color three lines according to the transfer clocks φ1, φ2A, and φ2B and the sample hold signals SH-R, SH-G, SH-B, and SH-B/W.

The transfer clock φ1 is a clock signal having a first phase. The transfer clock φ2A is a clock signal having a second phase. The transfer clocks φ1 and φ2A are substantially used for shift of charges. The transfer clock φ2B is a clock signal input to the capacitor 52.

The sample hold signals SH-R, SH-G, SH-B, and SH-B/W are control signals input to the shift gates 39b, 38b, 37b, 36b, and 36d.

The shift gates 39b, 38b, 37b, 36b, and 36d sample the charges shifted according to the transfer clocks φ1 and φ2A and hold the sampled charges in the analog shift registers 39c, 38c, 37c, 36c, and 36e.

FIGS. 4A to 4F are time charts for explaining an example of a sample hold signal and transfer clocks.

As shown in FIG. 4A, the sample hold signal (e.g., SH-B/W for monochrome) outputs one pulse. The pulse indicates a rectangular voltage pulse signal. The pulse triggers the operation of the shift gate 39b. The shift gate 39b samples the charges shifted according to the transfer clocks φ1 and φ2A and holds the charges in the analog shift register 39c.

As shown in FIGS. 4B to 4E, the phase of the transfer clock φ1 and the phase of the transfer clock φ2A are opposite to each other. Both the transfer clocks φ1 and φ2A have the same repetition period.

The analog pre-state processing unit 44 shown in FIGS. 2A and 3 executes analog processing and AD conversion (analog-to-digital conversion). The analog pre-stage processing unit 44 performs analog pre-stage processing. The analog processing indicates sample hold, clamp (voltage level adjustment), and gain control.

As shown in FIG. 2A, the analog pre-stage processing unit 44 includes, for each line, a reset gate 41, a clamp circuit 42, an amplifier 43, and an AD converter 62.

The reset gate 41 is a reset circuit for resetting the potential of the capacitor 52 to reference potential.

The clamp circuit 42 is a charge and discharge circuit configured to output an analog voltage signal. The amplifier 43 gives a gain to a signal. The clamp circuit 42 and the amplifier 43 adjust an output of the analog shift register 39c to a voltage level of a circuit provided further downstream than the amplifier 43.

The AD converter 62 for monochrome converts an analog output from the photodiode array of the K line sensor 36 into digital data.

The AD converters 62 for the color three lines respectively convert analog outputs from the photodiode arrays of the B line sensor 37, the G line sensor 38, and the R line sensor 39 into digital data. AD conversion outputs are pixel data of 8 to 10 bits.

The analog pre-stage processing unit 44 receives input of a sampling signal from the timing generator 41. The sampling signal is a signal substantially the same as the transfer clocks φ1, φ2A, and φ2B. The sampling signal is used for, for example, AD conversion.

Further, the signal processing device 14 includes an image-enable-signal generating unit 45 configured to generate an image enable signal in the main scanning direction HDEN (horizontal direction enable). The image-enable-signal generating unit 45 outputs an enable signal indicating a range of a valid image region of each of the four lines.

HDEN K, HDEN R, HDEN G and HDEN B represent image-enable-signals for black (HDEN FOR K), red (HDEN FOR R), green (HDEN FOR G) and blue (HDEN FOR B), respectively. HDEN RGB represents image-enable-signals for red, green and blue (HDEN FOR RGB), as well.

As shown in FIG. 4F, each of the four line sensors, i.e., the K line sensor 36, the B line sensor 37, the G line sensor 38, and the R line sensor 39 has a valid pixel region including about 7500 pixels, a light shield pixel, void data, and dummy data.

7500 is a value of an example in which the scanner 13 reads, for example, a sheet of the ISO (international standard) A4 size (297 mm×210 mm) at resolution of 600 dpi (dot per inch).

An example of reading of the sheet along a sheet side of 297 mm indicates that, according to a result (600 dpi/25.4 mm)× 297 mm=7015.7, the number of pixels of at least 7016 is required. In order to absorb individual fluctuation of the CCD sensor 30 and a shift of an original document, the number of pixels is added to 7016 in the scanner 13.

The CCD sensor 30 outputs, for example, about eight thousand serial charge signal sequences in the main scanning direction. For example, time length in which eight thousand times of charge signals appear is equivalent to light accumulation time for one line.

A relation between the light accumulation time and the R line sensor 39 is explained below.

The photodiodes of the R line sensor 39 generate, during first light accumulation time, charges according to reflection light reflected from an original document. The sample hold signal SH-R is input to the shift gate 39b within the first light accumulation time, whereby all the charges are transferred to the analog shift register 39c.

The analog shift register 39c outputs, during second light accumulation time, serial charge sequences to the outside in synchronization with the transfer clocks φ1, φ2A, and φ2B. The R line sensor 39 continuously repeats the operations in the first light accumulation time and the second light accumulation time.

Further, the signal processing device 14 shown in FIG. 3 includes a line delay unit 46 (a delay processing unit). The line delay unit 46 delays anyone or more of color image data of three lines output by the analog pre-stage processing unit 44.

The line delay unit 46 interpolates, with the delayed color image data, a blank on a line in the sub-scanning direction that is to be read according to a reduction magnification.

The line delay unit 46 outputs an image enable signal HDEN of one color type from image enable signals HDEN of three color types. The signal processing device 14 can be controlled using the same image enable signal HDEN among the color three lines.

The image processing device 14 includes a shading correction unit 47. The shading correction unit 47 applies shading correction to the color image data and the monochrome image data.

The shading correction indicates processing for substantially equalizing light reception amounts among the photodiodes. Since the lens 29 condenses reflected light of a linear light source, fluctuation occurs between a light amount in the center of the CCD sensor 30 and a light amount at both ends of the CCD sensor 30. The light amount in the center is large and the light amount at both the ends is small because of distortion of the lens 29.

Fluctuation in sensitivity is present among the photodiodes. The shading correction unit 47 reads, for each of pixels, a plate surface of a white plate and stores read data WHDT in a memory.

The shading correction unit 47 turns off the light source 25, reads, for each of pixels, a plate surface of a black plate, and stores read data BKDT in the memory. The white plate and the black plate indicate reference plates.

The shading correction unit 47 corrects, according to the following formula, the data WHDT, the data BKDT, and data IDT obtained by reading an original document:

Corrected document IDT={(document IDT−black reference BKDT)/(white reference WHDT−black reference BKDT)}×$A$ where, $A$ represents a coefficient and × represents multiplication. The shading correction unit 47 removes shading distortion according to an arithmetic operation.

The signal processing device 14 includes a selecting unit 48. The selecting unit 48 is an operation setting unit configured to select whether line delay by the line delay unit 46 is executed. For example, the main control unit 20 sets the line delay unit 46 in advance to perform a delay operation.

The signal processing device 14 includes an inter-line correction unit 49. The inter-line correction unit 49 aligns, according to a line interval, timing of the color image data from the line delay unit 46 and timing of the monochrome image data from the analog pre-stage processing unit 44.

The line interval indicates, for example, eight lines between the B line sensor 37 and the K line sensor 36. The inter-line correction indicates that positions of reading lines which are different among the lines of R, G, and B are corrected.

The inter-line correction unit 49 includes a line memory 61. The inter-line correction unit 49 reads R line data, G line data, and B line data in order and writes a reading result in the line memory 61.

The inter-line correction unit 49 reads B/W line data. After the reading, the inter-line correction unit 49 outputs the B/W line data simultaneously with the R line data, the G line data, and the B line data.

The inter-line correction unit 49 aligns image data of the four colors in a row in the sub-scanning direction. In the main scanning direction, the main control unit 20 changes the moving speeds of the carriages 32 and 33.

Inter-line correction processing and the magnification of an image are explained below.

As shown in FIG. 2B, in the CCD sensor 30, because of the structure of the CCD sensor 30, the lines of the respective colors RGB are arranged to be physically shifted in the sub-scanning direction by four pixels (or eight pixels, etc.).

Therefore, the scanner 13 needs to adjust phases of the four lines according to conveying speed of sub-scanning.

The scanner 13 realizes a change in a magnification in the sub-scanning direction by changing the moving speeds of the carriages 32 and 33. A magnification changing ratio is 25% to 400%.

The scanner 13 corrects a line interval between R and G and a line interval between G and B in the CCD sensor 30. An amount of correction of line positions is 1 to 16 (2 to 32) lines between R and G and is 1 to 16 (2 to 32) between G and B.

If a line of B is set as a reference, an amount of correction of line positions is 2 to 32 (4 to 64) lines concerning R and is 1 to 16 (2 to 32) lines concerning G.

Function of the signal processing device 14 is implemented by an ASIC (application specific integrated circuit). The signal processing device 14 transfers data to an image memory of the main control unit 20 through the harness 35 or a data bus.

In the MFP 10 having the configuration, basic timings of the operations of the signal processing device 14 and the CCD sensor 30 are shown in FIGS. 5A to 5H. HDEN represents an image enable signal. The signal names already described above other than HDEN represent signal names same as the signal names.

In the figures, the left side represents old data and the right side represents new data. Outputs I to VIII are the same as those shown in FIG. 3.

FIG. 5A is a time chart of the output I from the timing generator 41 to the CCD sensor 30. In the figure, "CLOCK" represents the transfer clock (e.g. the transfer clock $\phi1$). a sign "…" represents repetition of a pulse sequence. The output I represents a voltage level of plural data signals.

FIG. 5B is a time chart of the output II from the CCD sensor 30 to the analog pre-stage processing unit 44. In the figure, "SIGNAL (A)" represents a valid pixel signal and a sign (A) represents an analog signal. "IDLE" represents idle supply or a dummy signal.

FIG. 5C is a time chart of the output III from the timing generator 41 to the analog pre-stage processing unit 44.

FIG. 5D is a time chart of the output IV from the analog pre-stage processing unit 44 to the image-enable-signal generating unit 45. In the figure, "IMAGE DATA" represents valid image data and signs K(L) and K(H) respectively represent former half signal sequences and latter half signal sequences among about eight thousand serial signal sequences for monochrome.

FIG. 5E is a time chart of the output V from the image-enable-signal generating unit 45 to the line delay unit 46.

FIG. 5F is a time chart of the output VI from the line delay unit 46 to the shading correction unit 47.

Figure 5G:
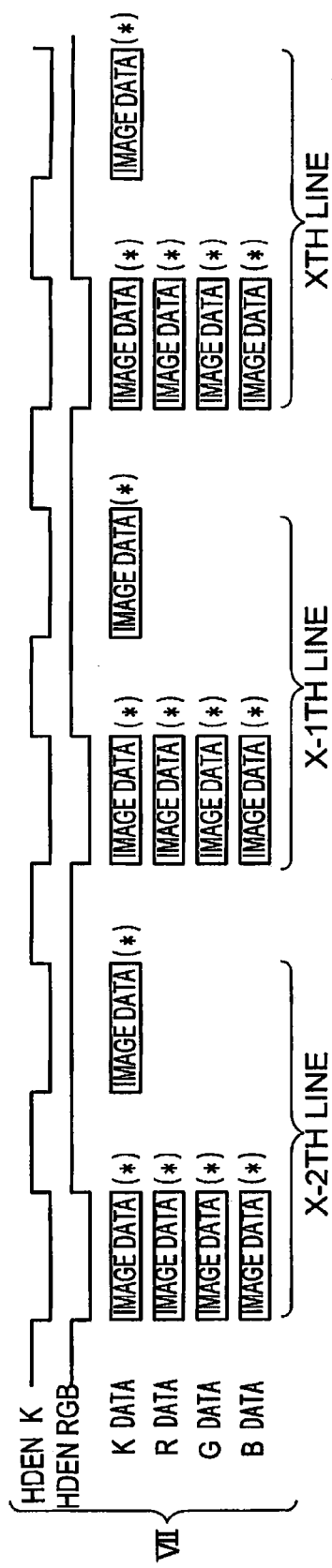
Figure 5H:
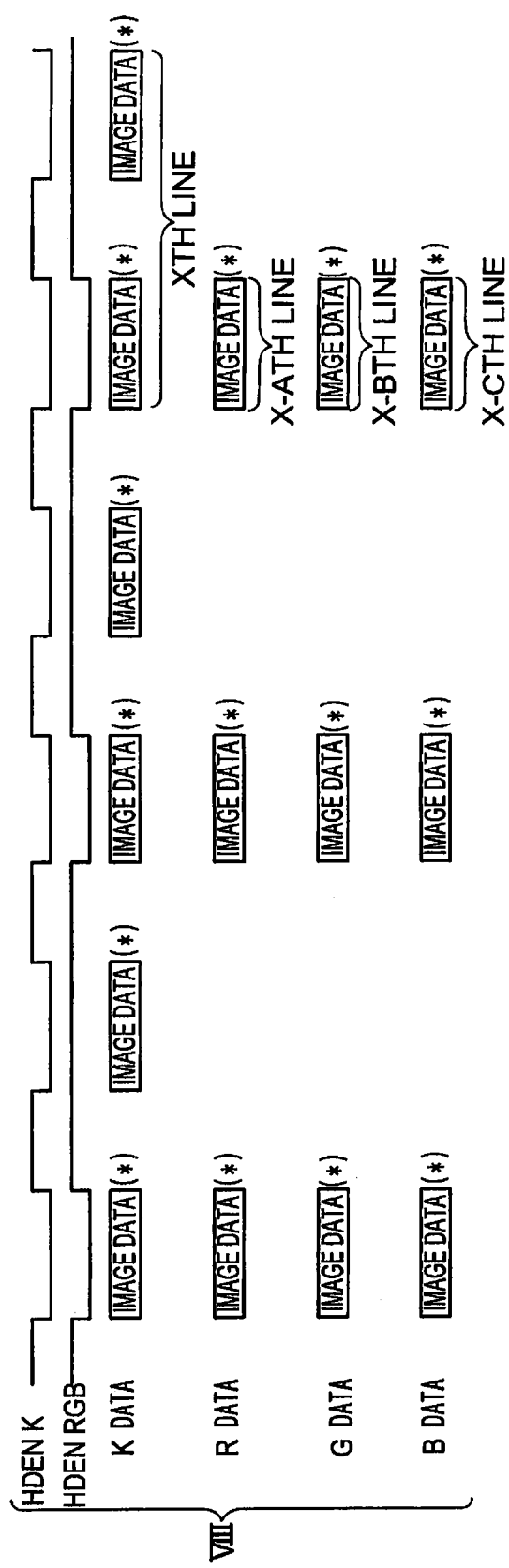

FIG. 5G is a time chart of the output VII from the shading correction unit 47 to the inter-line correction unit 49. In FIGS. 5G and 5H, "IMAGE DATA" represents valid image data and a sign (*) represents data after a shading operation.

FIG. 5H is a time chart of the output VIII from the inter-line correction unit 49. In the figure, A, B, and C represent arbitrary integers. A, B, and C have a relation A<B<C.

First, a user places an original document on the glass plate 34 of the scanner 13.

In the case of 100% (no magnification), the main control unit 20 is set to 100% in default.

The optical system 50 irradiates a light beam on an original document. The optical system 50 turns back reflected light with the mirrors 26, 27, and 28 and leads the reflected light to the lens 29. The lens 29 focuses a light image on the CCD sensor 30.

The main control unit 20 starts normal reading. The normal reading indicates reading processing at 100%.

Figure 6A:
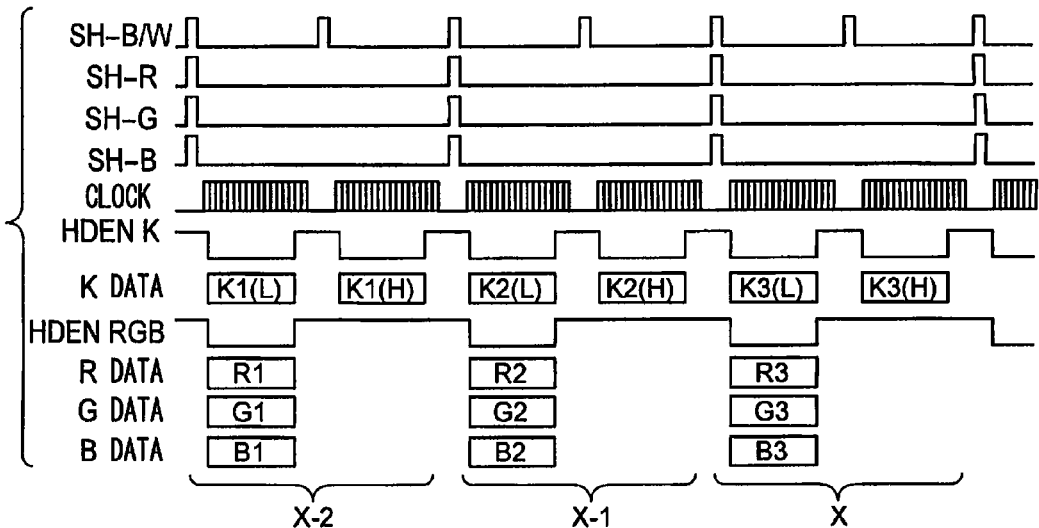
FIG. 6A is a time chart for explaining timings when image data are generated during 100% reading.

FIG. 6A is a time chart for explaining timings when image data are generated during 100% reading. In the figure, "CLOCK" represents the transfer clock. The signal names already described above represent signal names same as the signal names.

During the 100% reading, every time the signal processing device 14 outputs two pulses of the sample hold signal SH-B/W for monochrome, the signal processing device 14 outputs one pulse of the sample hold signals SH-R, SH-G, and SH-B for color.

The signal processing device 14 generates color image data of one line with respect to monochrome image data of two lines.

As shown in FIG. 2A, concerning a monochrome image, the photodiode array 36a accumulates charges by performing photoelectric conversion.

The K line sensor 36 transfers charges of photodiodes located in odd-number pixels in the photodiode array 36a to the analog shift register 36c via the shift gate 36b. The sample hold signal SH-B/W is applied to the shift gate 36b.

The charges transferred to the analog shift register 36c are sequentially transferred to an analog processing circuit at a post stage according to the transfer clock φ1.

The K line sensor 36 transfers charges of photodiodes located in even-number pixels to the analog shift register 36e through the shift gate 36d. The sample hold signal SH-B/W is applied to the shift gate 36d.

K line sensor 36 sequentially transfers the charges, which are transferred to the analog shift register 36e, to the analog processing circuit at the post stage according to the transfer clock φ2A.

In the CCD sensor 30, the K line sensor 36, the B line sensor 37, the G line sensor 38, and the R line sensor 39 generate charges during the first light accumulation time and transfer array-like charges to the analog shift register 39c and the like according to the sample hold signals SH-R, SH-G, SH-B, and SH-B/W.

The K line sensor 36, the B line sensor 37, the G line sensor 38, and the R line sensor 39 output signals during the second light accumulation time in synchronization with the transfer clocks φ1 and φ2A.

In the CCD sensor 30, the K line sensor 36, the B line sensor 37, the G line sensor 38, and the R line sensor 39 continuously repeat the operation within the first light accumulation time and the operation within the second light accumulation time.

The K line sensor 36 separately transfers charges of odd-number-th photodiodes and charges of even-number-th photodiodes. Thereafter, a multiplexer in the analog pre-stage processing unit 44 combines signal charges of two systems and outputs signal charges of one time series.

The timing generator 41 applies the transfer clocks φ1, φ2A, and φ2B and the sample hold signals SH-R, SH-G, SH-B, and SH-B/W, and a reset signal to the CCD sensor 30.

The CCD sensor 30 distributes the transfer clocks φ1, φ2A, and φ2B to the photodiode arrays 39a, 38a, 37a, and 36a. The CCD sensor 30 outputs, in time series, image data for one scanning in the sub-scanning direction.

The CCD sensor 30 outputs image data of four lines. An R output of the CCD sensor 30 is serial data including analog high and analog low for one row in the sub-scanning direction shifted by the analog shift register 39c. Examples of a G output, a B output, a B/W output 1, and a B/W output 2 are substantially the same as the example of the R output.

In an X-2th line, the signal processing device 14 outputs color data R1, G1, and B1 at the same timing as monochrome data K1(L). The signal processing device 14 subjects the data R1, G1, B1, and K1(L) to shading correction all together and applies processing such as line correction or the like to the data.

Examples of image data on an X-1th line and image data on an Xth line are substantially the same as the example of the image data on the X-2th line.

The MFP 10 ends the image reading during the 100% reading. The MFP 10 prints and outputs an image onto a sheet with the printing process unit 16.

On the other hand, in the case of 50%, the main control unit 20 detects a user input onto the operation panel 63. The main control unit 20 instructs the signal processing device 14 to perform 50% reading. The scanner 13 sets main conveyance speed and sub-conveyance speed to 50% of the main conveyance speed and the sub-conveyance speed. The scanner 13 reads an original document.

Figure 6B:
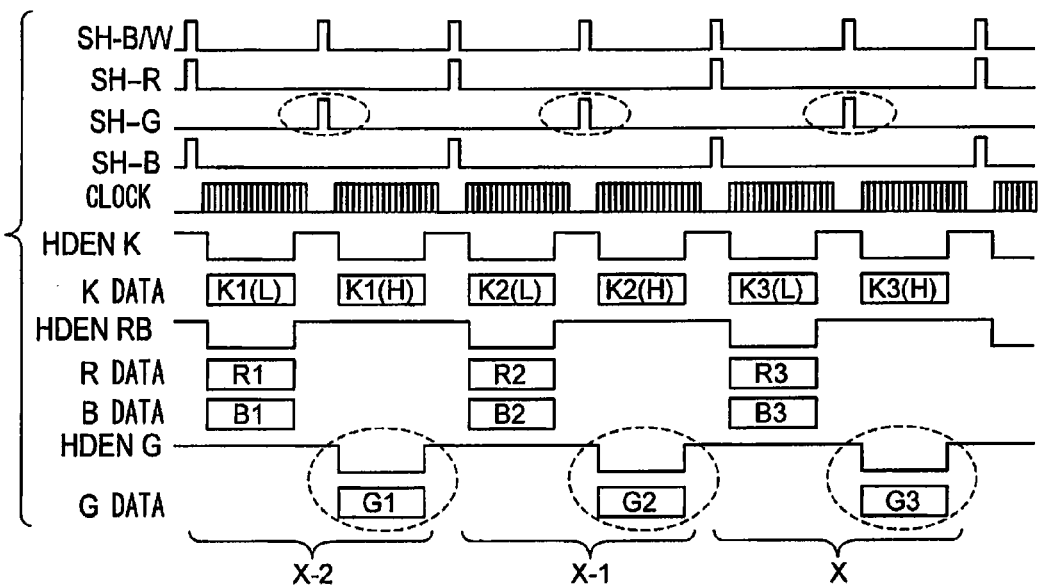
FIG. 6B is a time chart for explaining timings when image data are generated during 50% reading.

FIG. 6B is a time chart for explaining timing when image data is generated during the 50% reading. The signal names already described above represent signal names same as the signal names.

During the 50% reading, the signal processing device 14 outputs the sample hold signal SH-G for G at timing same as timing of monochrome data K(H). R data and B data among color data are at timing same as timing of monochrome data K(L).

Figure 6C:
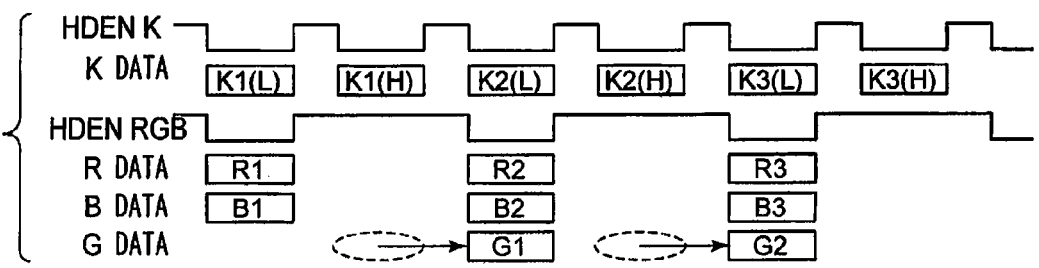
FIG. 6C is a time chart for explaining timings after one line delay of the image data during 50% reading.

FIG. 6C is a time chart for explaining timing after one line delay of image data during the 50% reading. The signal names already described above represent signal names same as the signal names.

The signal processing device 14 delays G data by one line from a state shown in FIG. 6B. For example, timing of the delayed data G1 is the same as timing of data B2, data R2, and data K2(L). A state after the delay is the same as the state during the 100% reading.

Thereafter, the signal processing device 14 subjects the data G1, B2, R2, and K2(L) to shading correction all together and applies processing such as line correction to the data. Examples of data G2, data B3, data R3, and data K3(L) are substantially the same as the example of the data G1.

In this way, during the 50% reading, the signal processing device 14 can control all the R, G, and B data using the image enable signal HDEN same as the image enable signal HDEN during the 100% reading.

Even if the resolution of monochrome line and the resolution of the color three lines are different in the CCD sensor 30, reduced copy becomes operative.

A basic example of line delay processing is explained above.

Further control by the signal processing device 14 is control for selecting whether line delay is executed.

If line intervals having odd-number values are formed depending on arrangement intervals in the sub-scanning direction among the line sensors 36 to 39 (the K line sensor 36, the B line sensor 37, the G line sensor 38, and the R line sensor 39) and a magnification, the signal processing device 14 executes the line delay.

For example, if physical intervals are set to 6-6-8 and a magnification is set to 50%, this results in line intervals 3-3-4. If odd number values of 3 and 3 are present, a blank of image data that is to be read on a line in the sub-scanning direction is formed.

The signal processing device 14 inverts the phase of a pulse of any one of the sample hold signals SH-B/W, SH-R, SH-G, and SH-B and outputs the pulse having the inverted phase. As a result, the signal processing device 14 delays any one of the image data by one line. The delayed image data interpolates a blank in a data sequence.

Originally, the line intervals 6-6-8 are values determined according to a technical demand for circuit packaging. The technical demand indicates that, for example, line intervals are narrowed as much as possible while a line memory is prevented from being mounted in an ASIC chip.

As physical line intervals between R and G, between G and B, and between B and K, in some cases, the signal processing device 14 implements various combinations such as 6-6-6, 4-4-8, 6-6-12, 8-8-8, and 8-8-12.

Specifically, the line interval 4-4-8 and the magnification 50% result in line intervals 2-2-4. The line intervals 8-8-12 and the magnification 50% result in line intervals 4-4-6. If all values of line intervals are even numbers, the signal processing device 14 does not execute the line delay.

The line intervals 8-8-8 and the magnification 50% result in line intervals 4-4-4. The line intervals 8-8-8 and the magnification 25% result in line intervals 2-2-2. If all values of line intervals are even numbers, the signal processing device 14 does not execute the line delay.

The line intervals 6-6-6 and the magnification 50% result in line intervals 3-3-3. The line intervals 6-6-12 and the magnification 50% result in line intervals 3-3-6. If line intervals having values of odd numbers are formed, the signal processing device 14 executes the line delay.

On the other hand, the line intervals 6-6-8 and the magnification 25% result in indivisible values. The signal processing device 14 does not use an indivisible combination.

If a magnification is larger than 100%, a blank in a data sequence is not formed. The signal processing device 14 does not execute the line delay.

If line intervals and a magnification form a divisible combination and odd numbers are present in a result obtained by dividing the line intervals by 2, a blank is formed in data in any place. In that case, the signal processing device 14 executes the line delay.

The signal processing device 14 outputs each monochrome K line. If K data is set as a reference and any color line, a line interval of which from the K data is an odd number, is present, the signal processing device 14 executes the line delay.

Examples in which a combination of line intervals and a magnification is changed are explained below.

1. Processing by a four-line CCD having resolution 600 dpi for monochrome and resolution 300 dpi for color (the resolution of color is a half of the resolution of monochrome)

(1-1) The CCD sensor 30 in which line intervals between R and G, between G and B, and between B and K are respectively 6-6-8

In the CCD sensor 30 shown in FIG. 2B, each of line intervals between R pixels and G pixels and between the G pixels and B pixels is six lines. An interval between the B pixels and K pixels is eight lines.

As shown in FIG. 5A, the timing generator 41 drives the CCD sensor 30 and the analog pre-stage processing unit 44 according to the sample hold signals SH-B/W, SH-R, SH-G, and SH-B and the transfer clocks φ1 and φ2A.

In the example shown in the figure, the number of pulses of the sample hold signal SH-B/W is twice as large as the number of pulses of the sample hold signals SH-R, SH-G, and SH-B.

The signal processing device 14 outputs each of the sample hold signals SH-R, SH-G, and SH-B of one pulse for each output of sample hold signal SH-B/W of two pulses. The signal processing device 14 generates one line of each of RGB for every monochrome two lines.

Then, as shown in FIG. 5D, the analog pre-stage processing unit 44 outputs the color data RGB and the monochrome data K(L) in the former half (a first line) with respect to the image enable signal HDEN for one line.

In the latter half (a second line), the analog pre-stage processing unit 44 outputs dummy data 53 and the monochrome data K(H) as color data.

The analog pre-stage processing unit 44 outputs data by repeating the operation explained above. Thereafter, the signal processing device 14 executes processing such as shading correction and inter-line correction.

During 50% reduction reading, the signal processing device 14 starts reduction reading at the line intervals shown in FIG. 2C.

Problems that occurs during reduction processing and measures against the problems are explained below.

Figure 7A:
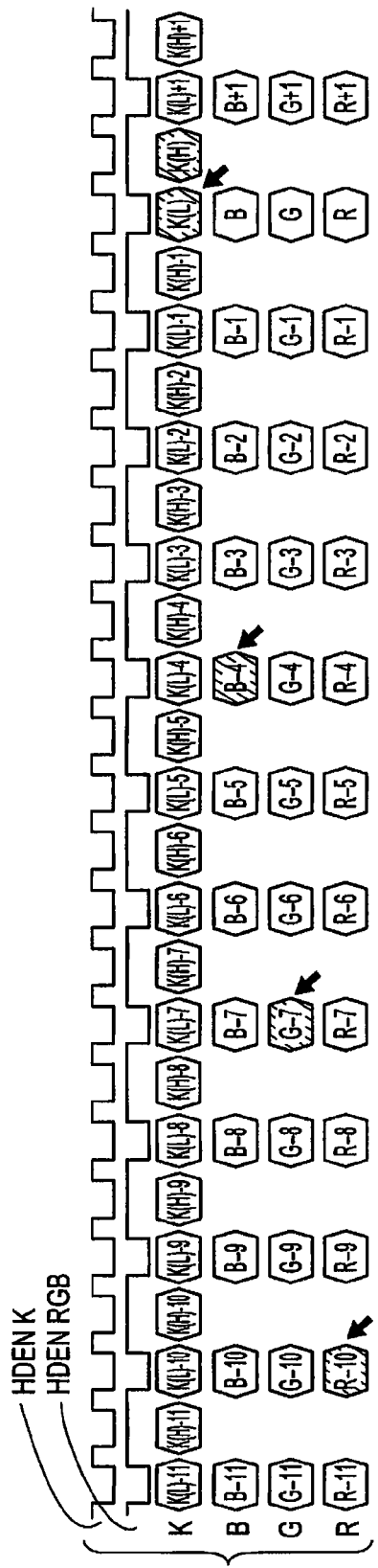
FIG. 7A is a time chart of image data before inter-line correction processing during normal reading.
Figure 7B:
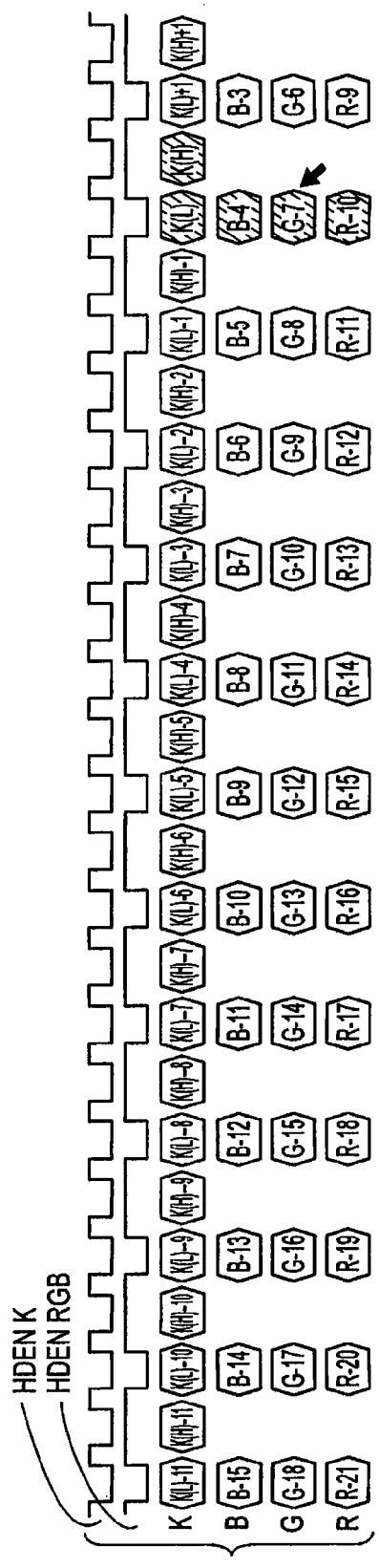
FIG. 7B is a time chart of image data after the inter-line correction processing during the normal reading.

FIG. 7A is a time chart of image data before inter-line correction processing during the normal reading. In the figure, "K", "B", "G" and "R" represent K DATA, B DATA, G DATA and R DATA, respectively. FIG. 7B is a time chart of image data after the inter-line correction processing during the normal reading.

As shown in FIG. 7B, the signal processing device 14 aligns, on the same line, image data (see arrows in FIG. 7A) on different lines.

During the normal reading, the B pixels are shifted from reference K pixel data by eight lines. The inter-line correction unit 49 executes line delay such that the reference image data K(L) and image data (B-4) eight lines before the reference image data K(L) are on the same line. The execution of the line delay indicates delaying the K pixel data.

The B pixels and the G pixels are shifted from each other by six lines. The inter-line correction unit 49 executes the line delay such that the reference image data K(L) and image data (G-7) fourteen lines (eight lines+six lines) before the reference image data K(L) are on the same line.

The G pixels and R pixels are shifted from each other by six lines. The inter-line correction unit 49 executes the line delay such that the reference image data K(L) and image data (R-10) twenty lines (eight lines+six lines+six lines) before the reference image data K(L) are on the same line.

On the other hand, in the case of the 50% reduction reading, processing targets of the signal processing device 14 are data sequences at line intervals shown in FIG. 2C.

Each of a line interval between the R pixels and the G pixels and a line interval between the G pixels and the B pixels is three lines. A line interval between the B pixels and the K pixels is four lines.

It is assumed that, as shown in FIG. 5A, the signal processing device 14 generates a sample hold signal at timing same as the timing during the normal reading.

Figure 7C:
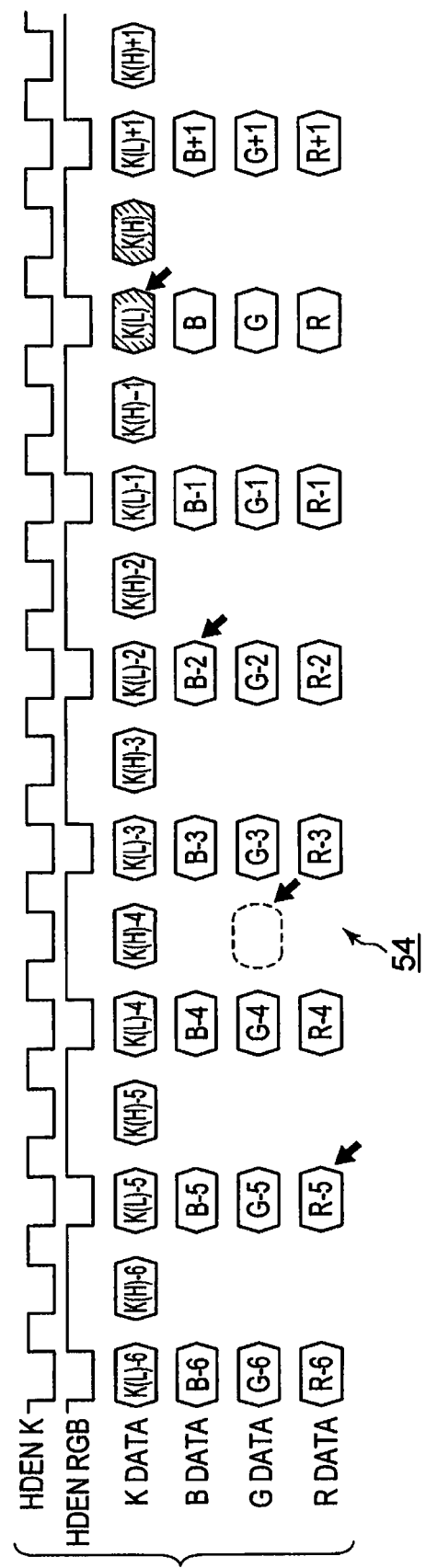
FIG. 7C is a time chart of image data before the inter-line correction processing during 50% reduction reading.

FIG. 7C is a time chart of image data before the inter-line correction processing during the 50% reduction reading. An example in which the CCD sensor 30 is driven at the normal reading timing (FIG. 5A) is shown in the figure. Image data on lines indicated by arrows represent data necessary for inter-line correction.

The inter-line correction unit 49 needs to execute the line delay such that B data four lines before K data, G data seven lines before the K data, and R data ten lines before the K data are on the same line.

However, the G data necessary for the correction processing is not generated as shown in FIG. 7C. A blank 54 of image data that is to be read on a line in the sub-scanning direction is present.

The signal processing device 14 can fill the blank 54 with data read out using another timing clock (see FIGS. 8A to 8C referred to below). However, inconveniences still remain.

FIG. 8A is a time chart of the output I during the 50% reduction reading.

FIG. 8B is a time chart of the output IV at the time when the CCD sensor 30 is driven at timing shown in FIG. 8A. Hatched portions represent dummy data.

FIG. 8C is a time chart of image data before the inter-line correction processing at the timing shown in FIG. 8A. The signs already described in FIGS. 8A to 8C represent signs same as the signs.

As shown in FIG. 8A, the signal processing device 14 generates the sample hold signal SH-G for G at timing same as timing of the monochrome data K(H). The signal processing device 14 uses the monochrome data K(H) instead of the monochrome data K(L).

As shown in FIG. 8B, timing of R data and timing of B data are the same as timing of the monochrome data K(L). Timing of G data is the same as the timing of the monochrome data K(H).

As shown in FIG. 8C, the signal processing device 14 generates the G data necessary for inter-line correction. Data seven lines before the reference image data K(L) is obtained.

As shown in FIGS. 8A to 8C, the signal processing device 14 generates the sample hold signal SH-R of the G data is at timing different from timing of the sample hold signals SH-R and SH-B. The generation with the timing difference enables to prevent a problem of absence of data necessary for the inter-line correction processing.

However, in the processing shown in FIGS. 8A to 8C, the signal processing device 14 has to control the inter-line correction at separate timings between the R data and the B and G data. This is inconvenient.

In order to prevent the inconvenience, the line delay unit 46 delays, before the inter-line correction processing, the G data by one line from a state shown in FIG. 8B. The line delay unit 46 sets the delayed timing of the G data and the timings of the R data and the B data the same.

FIG. 8D is a time chart of image data before the inter-line correction processing during the 50% reduction reading.

Processing in which the inter-line correction unit 49 delays the G data is added. The addition enables to handle data at the timing during the normal reading shown in FIG. 7A.

In FIGS. 8C and 8D, the G data further on the left is older. Image data G-1 is already output at time t shown in FIG. 8C. At time t shown in FIG. 8D, the image data G-1 is located on the right by a half period of the image enable signal HDEN. The image data G-1 is delayed by the half period.

As a result, the signal processing device 14 can perform processing such as shading correction and inter-line correction simultaneously for RGB. The signal processing device 14 does not need to perform additional processing for controlling the respective timings.

The inter-line correction unit 49 needs to delay the G data by seven lines. However, the line delay unit 46 already delays data for one line. The signal processing device 14 only has to delay the G data by six lines. The "six lines" indicates that one line is subtracted from the seven lines for delay necessary for the G data.

The signal processing device 14 includes the line delay unit 46 at the pre-stage of the shading correction unit 47 because the shading correction unit 47 also needs to perform the additional processing for controlling the respective timings same as the inter-line correction in the 50% reading.

(1-2) A CCD sensor in which line intervals between R and G, between G and B, and between B and K are 6-6-6

FIG. 9A is a diagram of a configuration example of a CCD sensor in which line intervals are 6-6-6. All line intervals between R pixels and G pixels, between the G pixels and B pixels, and between the B pixels and K pixels are six lines. Except the intervals, the configuration of a CCD sensor 55 is substantially the same as the configuration of the CCD sensor 30.

FIG. 9B is a diagram of intervals of four lines at a magnification 50% by the CCD sensor 55 shown in FIG. 9A. In FIGS. 9A and 9B, the reference numerals and signs already described above denote components same as the components denoted by the reference numerals and signs.

The main control unit 20 starts normal reading.

First, the timing generator 41 drives the CCD sensor 55 and the analog pre-stage processing unit 44 according to the sample hold signals SH-B/W, SH-R, SH-G, and SH-B shown in FIG. 5A.

The signal processing device 14 generates one line of each of RGB for every monochrome two lines of the sample hold signal SH-B/W.

Then, as shown in FIG. 5D, the analog pre-stage processing unit 44 outputs the color data RGB and the monochrome data K(L) in the former half (a first line) with respect to the image enable signal HDEN for one line.

In the latter half (a second line), the analog pre-stage processing unit 44 outputs dummy data and the monochrome data K(H) as color data. The analog pre-stage processing unit 44 repeats the output to output data.

Thereafter, the signal processing device 14 executes processing such as shading correction and inter-line correction in the same manner as the processing explained in (1-1) above.

The main control unit 20 detects a command for 50% reduction by user operation. The main control unit 20 instructs the signal processing device 14 to perform 50% reading. The signal processing device 14 starts reduction processing using the CCD sensor 55 shown in FIG. 9A.

Problems that occur during the reduction processing and measures against the problems are explained below.

Figure 10A:
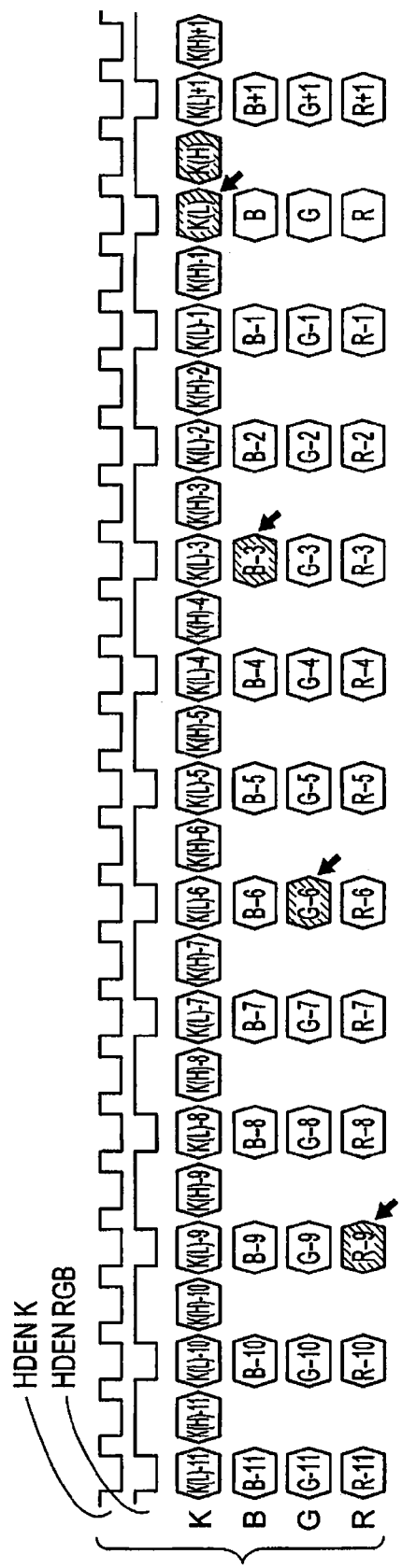
FIG. 10A is a time chart of image data before the inter-line correction processing during the normal reading.
Figure 10B:
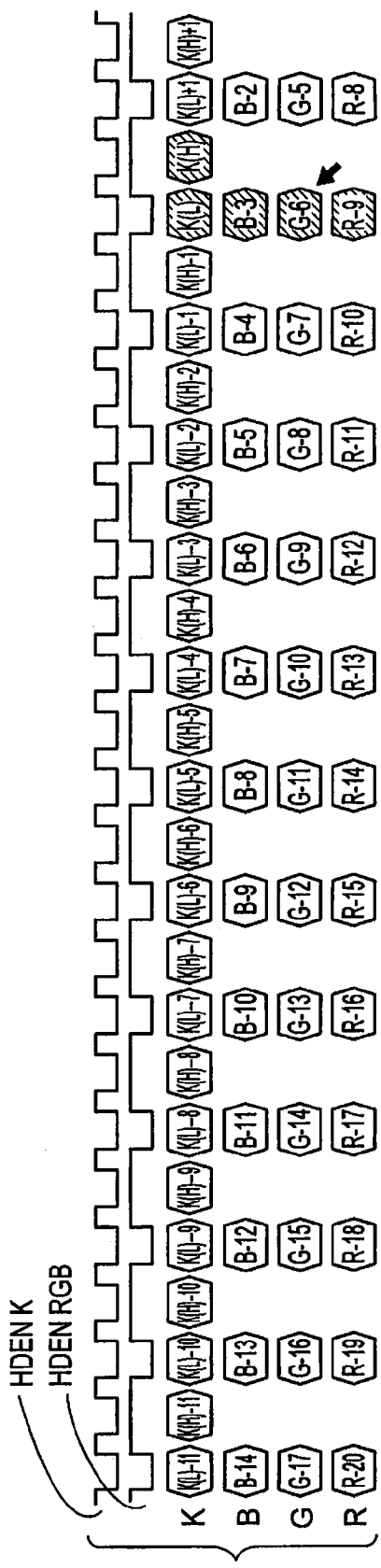
FIG. 10B is a time chart of image data after the inter-line correction processing during the normal reading.

FIG. 10A is a time chart of image data before inter-line correction processing during the normal reading. FIG. 10B is a time chart of image data after the inter-line correction processing during the normal reading.

As shown in FIG. 10B, the signal processing device 14 aligns, on the same line, image data on lines indicated by arrows in FIG. 10A.

During the normal reading, the B pixels are shifted from reference K pixel data by six lines.

The inter-line correction unit 49 executes line delay such that the reference image data K(L) and image data (B-3) six lines before the reference image data K(L) are on the same line. The execution of the line delay indicates delaying the K pixel data.

The B pixels and the G pixels are shifted from each other by six lines. The inter-line correction unit 49 executes the line delay such that the reference image data K(L) and image data (G-6) twelve lines (six lines+six lines) before the reference image data K(L) are on the same line.

The G pixels and the R pixels are shifted from each other by six lines. The inter-line correction unit 49 executes the line delay such that the reference image data K(L) and image data (R-9) eighteen lines (six lines+six lines+six lines) before the reference image data K(L) are on the same line.

On the other hand, in the case of 50% reduction reading, all of a line interval between the R pixels and the G pixel, a line interval between the G pixels and the B pixels, and a line interval between the B pixels and the K pixels are three lines.

It is assumed that, as shown in FIG. 5A, the signal processing device 14 generates a sample hold signal at timing same as timing during the normal reading. An example in which the CCD sensor 55 is driven at the timing of the normal reading is shown in FIG. 10C.

Figure 10C:
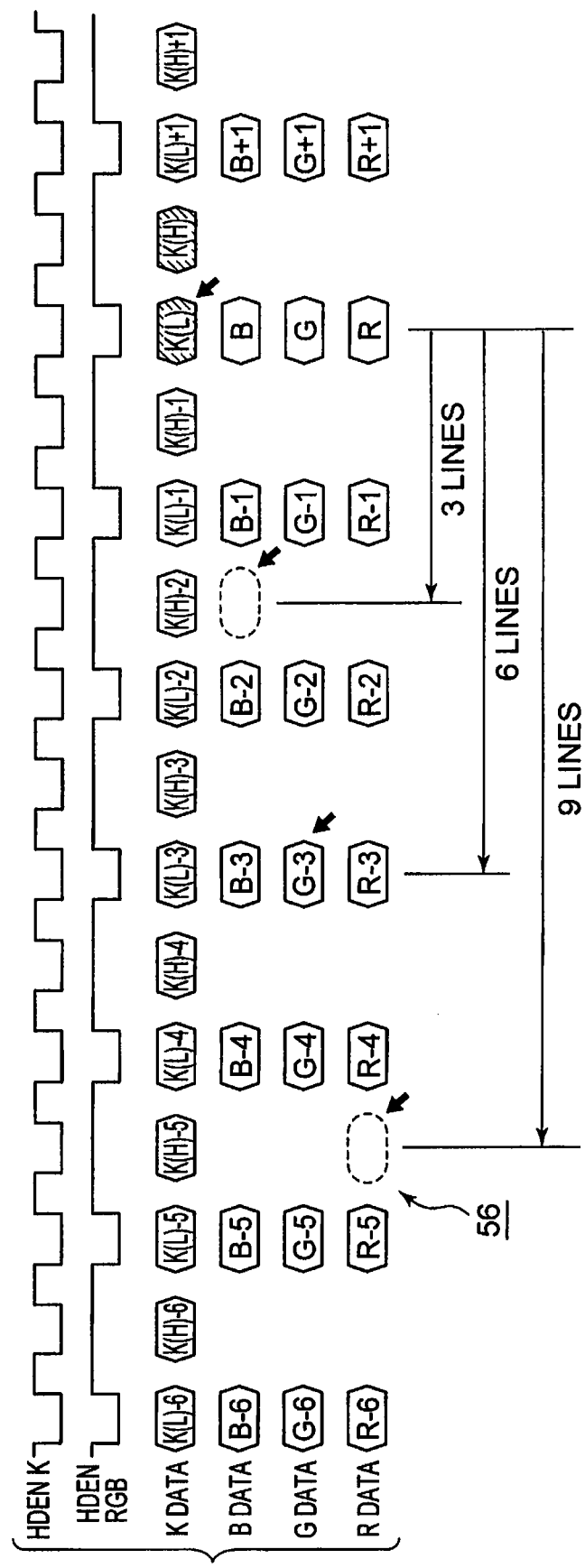
FIG. 10C is a time chart of image data before the inter-line correction processing during the 50% reduction reading.

FIG. 10C is a time chart of image data before the inter-line correction processing during the 50% reduction reading.

The inter-line correction unit 49 needs to execute the line delay such that B data three lines before K data, G data six lines before the K data, and R data nine lines before the K data are on the same line. However, the B data and the G data necessary for the correction processing are not generated as shown in FIG. 10C. Data that is to be read is missing. A blank 56 is present.

The signal processing device 14 can fill the blank 56 with another data using another timing clock (see FIGS. 11A to 11C referred to below). However, inconveniences still remain.

Figure 11C:
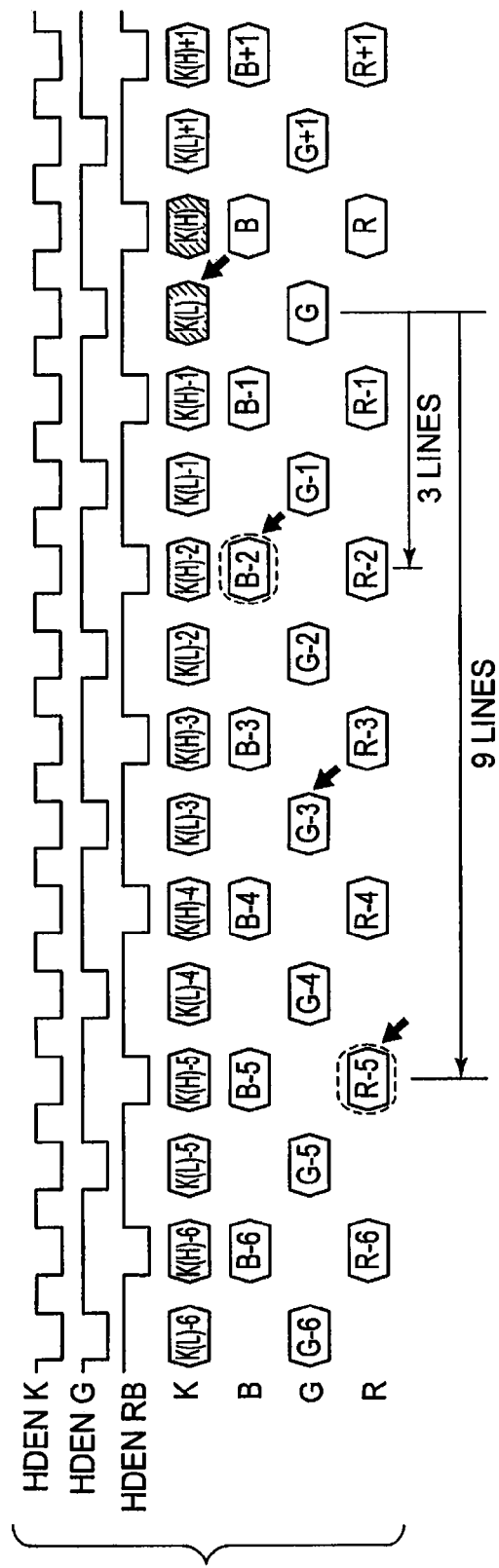
FIG. 11C is a time chart of image data before the inter-line correction processing at the timing shown in FIG. 11A.

FIG. 11A is a time chart of the output I during the 50% reduction reading. FIG. 11B is a time chart of the output IV at the time when the CCD sensor 55 is driven at timing shown in FIG. 11A. FIG. 11C is a time chart of image data before the inter-line correction processing at the timing shown in FIG. 11A.

As shown in FIG. 11A, the signal processing device 14 generates the sample hold signal SH-B for B and the sample hold signal SH-R for R at timing same as timing of the monochrome data K(H).

Then, as shown in FIG. 11B, timing of G data is the same as timing of the monochrome data K(L). Timing of R data and timing of B data are the same as the timing of the monochrome data K(H).

As shown in FIG. 11C, the signal processing device 14 generates the B data and the R data necessary for inter-line correction. The B data is data three lines before the reference image data K(L). The R data is data nine lines before the reference image data K(L).

As shown in FIGS. 11A to 11C, the signal processing device 14 generates the sample hold signal SH-R of the R data and the sample hold signal SH-B of the B data at timing different from timing of the sample hold signals SH-G of the G data. The generation with the timing difference enables to prevent a problem that data necessary for the inter-line correction processing is not generated.

However, in the processing shown in FIGS. 11A to 11C, the signal processing device 14 has to control the shading correction at separate timings between the R and B data and the G data. This is inconvenient.

In order to prevent the inconvenience, the line delay unit 46 delays, before the inter-line correction processing, the R data and the B data by one line from a state shown in FIG. 11C. The line delay unit 46 sets each of the timings of the R data and the B data after the delay same as timing of the G data.

Figure 11D:
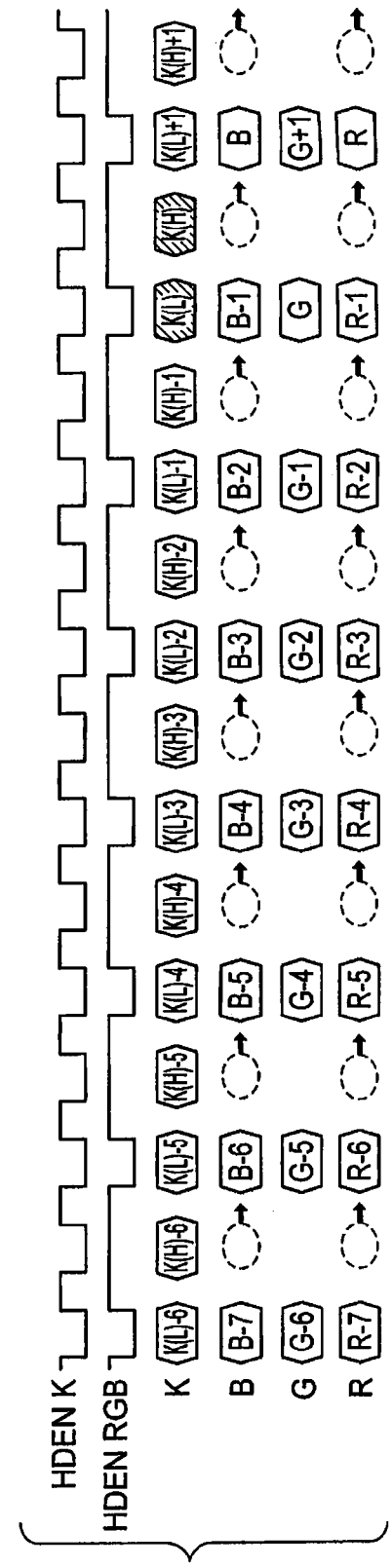
FIG. 11D is a time chart of image data before the interline-correction processing during the 50% reading.

FIG. 11D is a time chart of image data before the inter-line correction processing during the 50% reading.

Processing in which the line delay unit 46 delays the R data and the B data is added. The addition enables to handle data at timing same as the timing during the normal reading shown in FIG. 10A.

As a result, the signal processing device 14 can perform processing such as shading correction and inter-line correction simultaneously for RGB. The signal processing device 14 does not need to perform additional processing for controlling the respective timings.

The inter-line correction unit 49 needs to delay the B data and the R data by three lines and nine lines, respectively. However, the line delay unit 46 already delays data for one line.

The signal processing device 14 only has to delay the B data by two lines and delay the R data by eight lines. The "two lines" indicates that one line is subtracted from the three lines for delay necessary for the B data. The "eight lines" indicates that one line is subtracted from the nine lines for delay necessary for the R data.

The signal processing device 14 includes the line delay unit 46 at the pre-stage of the shading correction unit 47 because the shading correction unit 47 also needs to perform the additional processing for controlling the respective timings same as the inter-line correction in the 50% reading.

(1-3) A CCD sensor in which line intervals between R and G, between G and B, and between B and K are 4-4-8

FIG. 12A is a diagram of a configuration example of a CCD sensor in which line intervals are 4-4-8. Each of line intervals between R pixels and G pixels, and between the G pixels and B pixels is four lines. A line interval between the B pixels and K pixels is eight lines. Except the intervals, the configuration of a CCD sensor 57 is substantially the same as the configuration of the CCD sensor 30.

FIG. 12B is a diagram of intervals of four lines at a magnification 50% by the CCD sensor 57 shown in FIG. 12A. In FIGS. 12A and 12B, the reference numerals and signs already described above denote components same as the components denoted by the reference numerals and signs.

The main control unit 20 starts normal reading.

First, the timing generator 41 drives the CCD sensor 57 and the analog pre-stage processing unit 44 according to the sample hold signals SH-B/W, SH-R, SH-G, and SH-B shown in FIG. 5A.

The signal processing device 14 generates one line of each of RGB for every monochrome two lines of the sample hold signal SH-B/W.

Then, as shown in FIG. 5D, the analog pre-stage processing unit 44 outputs the color data RGB and the monochrome data K(L) in the former half (a first line) with respect to the image enable signal HDEN for one line.

In the latter half (a second line), the analog pre-stage processing unit 44 outputs the dummy data 53 and the monochrome data K(H) as color data. The analog pre-stage processing unit 44 repeats the output to output data.

Thereafter, the signal processing device 14 executes processing such as shading correction and inter-line correction in the same manner as the processing explained in (1-1) and (1-2) above.

The main control unit 20 instructs the signal processing device 14 to perform 50% reading. The signal processing device 14 starts reduction processing using the CCD sensor 57.

Figure 13A:
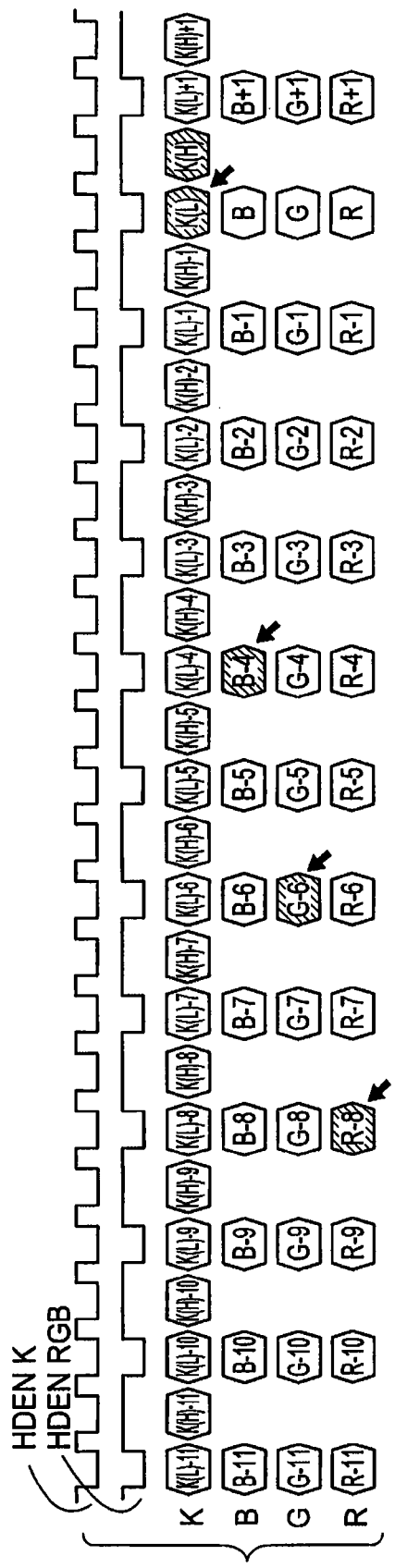
FIG. 13A is a time chart of image data before the inter-line correction processing during the normal reading.
Figure 13B:
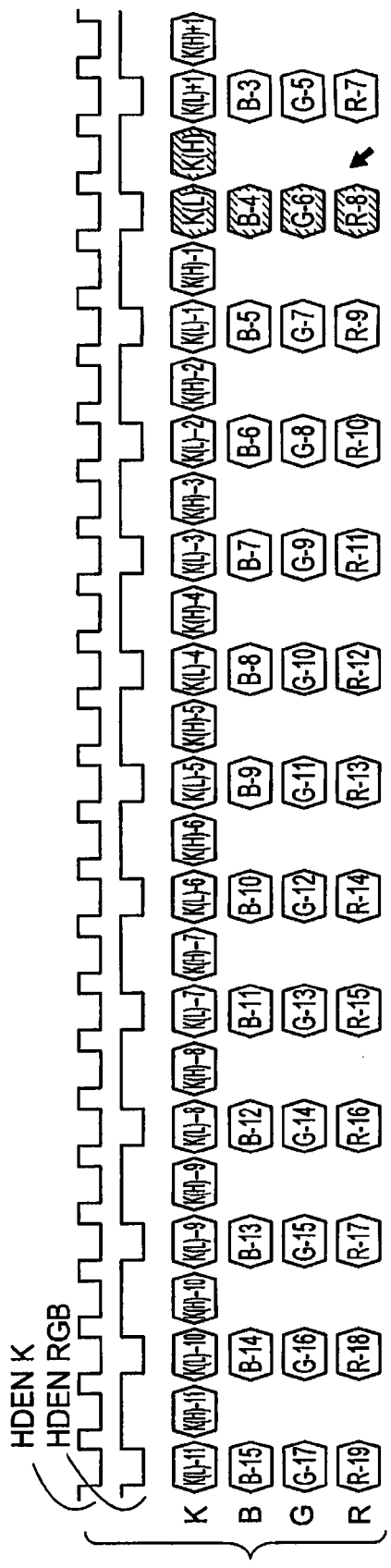
FIG. 13B is a time chart of image data after the inter-line correction processing during the normal reading.

FIG. 13A is a time chart of image data before inter-line correction processing during the normal reading. FIG. 13B is a time chart of image data after the inter-line correction processing during the normal reading.

As shown in FIG. 13B, the signal processing device 14 aligns, on the same line, image data on lines indicated by arrows in FIG. 13A.

In this case, during the normal reading, B pixels are shifted from reference K pixels of the CCD sensor 57 by eight lines. The inter-line correction unit 49 executes line delay such that the reference image data K(L) and image data (B-4) eight lines before the reference image data K(L) are on the same line.

The B pixels and G pixels are shifted from each other by four lines. The inter-line correction unit 49 executes the line delay such that the reference image data K(L) and image data (G-6) twelve lines (eight lines+four lines) before the reference image data K(L) are on the same line.

The G pixels and R pixels are shifted from each other by four lines. The inter-line correction unit 49 executes the line delay such that the reference image data K(L) and image data (R-8) sixteen lines (eight lines+four lines+four lines) before the reference image data K(L) are on the same line.

On the other hand, in the case of 50% reduction reading, as shown in FIG. 12B, the signal processing device 14 sets, as processing targets, two lines of a line interval between the R pixels and the G pixels, two lines of a line interval between the G pixels and the B pixels, and four lines of a line interval between the B pixels and the K pixels.

It is assumed that, as shown in FIG. 5A, the signal processing device 14 generates a sample hold signal at timing same as timing during the normal reading. An example in which the CCD sensor 57 is driven at the timing of the normal reading (FIG. 5A) is shown in FIG. 13C.

Figure 13C:
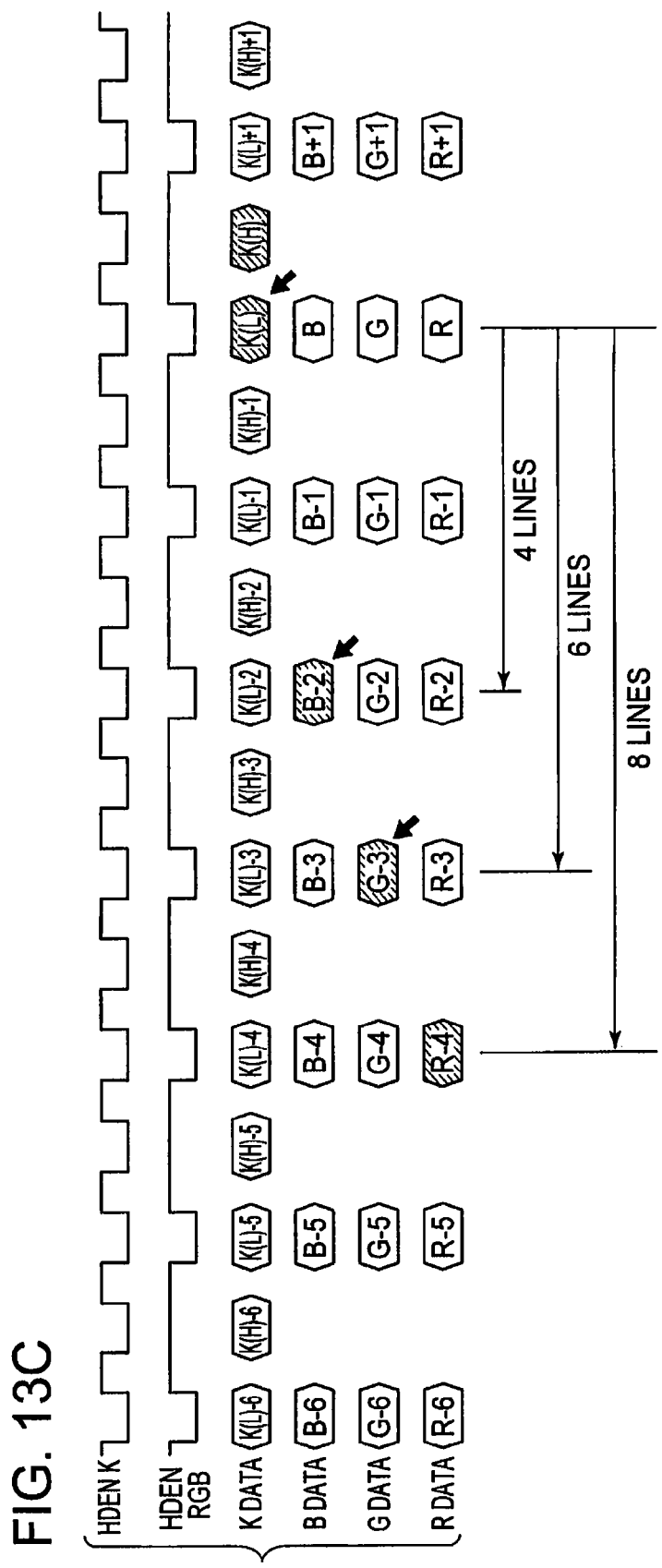
FIG. 13C is a time chart of image data before the inter-line correction processing during the 50% reduction reading.

FIG. 13C is a time chart of image data before the inter-line correction processing during the 50% reduction reading.

The inter-line correction unit 49 needs to execute the line delay such that B data four lines before K data, G data six lines before the K data, and R data eight lines before the K data are on the same line.

As shown in FIG. 5A, the signal processing device 14 generates a sample hold signal at timing same as timing during 100% reading. However, in this case, unlike the examples of (1-1) and (1-2) explained above, as shown in FIG. 13C, data of all RGB necessary for the inter-line correction are present. At all hatched points indicated by arrows, data about to be corrected are present.

In (1-1), (1-2), and (1-3), the four-line CCD has the relation in which the resolution of color is a half of the resolution of monochrome. However, the resolution of color may be one third of the resolution of monochrome.

Second Embodiment

The signal processing device 14 executes line delay if line intervals and a magnification form a divisible combination and odd numbers are present in a result obtained by dividing the line intervals by 2.

In a second embodiment, an example in which the resolution of color is one third of the resolution of monochrome is explained.

An image forming apparatus according to the second embodiment is the MFP 10. An image reading apparatus according to the second embodiment is the scanner 13. An image reading method according to the second embodiment is also a method of reading image data with a four-line CCD in which the resolution of a monochrome line and the resolution of color three lines are different.

Except for that point, unless specifically noted otherwise, the image forming apparatus according to this embodiment has a configuration substantially the same as the example in the first embodiment.

In the following explanation, the resolution of the K line sensor 36 for black and white is three times as large as the resolution of each of the R line sensor 39, the G line sensor 38, and the B line sensor 37.

2. Processing by a four-line CCD having resolution 600 dpi for monochrome and resolution 200 dpi for color (the resolution of color is one third of the resolution of monochrome)
(2-1) A CCD sensor in which line intervals between R and G, between G and B, and between B and K are respectively 6-6-12

FIG. 14A is a diagram of a line interval example of a CCD sensor used in the image reading apparatus according to the second embodiment.

A CCD sensor 58 has functions substantially the same as the functions of the CCD sensor 30. Each of line intervals between R pixels and G pixels and between the G pixels and B pixels is six lines and a line interval between the B pixels and K pixels is twelve lines.

FIG. 14B is a diagram of intervals of four lines at a magnification 50% by the CCD sensor 58 shown in FIG. 14A. In FIGS. 14A and 14B, the reference numerals and signs already described above denote components same as the components denoted by the reference numerals and signs.

FIG. 15A is a time chart of the output I from the timing generator 41 to the CCD sensor 58.

The timing generator 41 drives the CCD sensor 58 and the analog pre-stage processing unit 44 according to the sample hold signals SH-B/W, SH-R, SH-G, and SH-B shown in FIG. 15A.

The number of pulses of the sample hold signal SH-B/W is three times as large as the number of pulses of the sample hold signals SH-R, SH-G, and SH-B.

The signal processing device 14 outputs each of the sample hold signals SH-R, SH-G, and SH-B of one pulse for each output of the sample hold signal SH-B/W of three pulses.

FIG. 15B is a time chart of the output IV at the time when the CCD sensor 58 is driven at timing shown in FIG. 15A. In the figure, monochrome image data is a data sequence of repetition of K(L), K(C), and K(H).

The signs K(L), K(C), and K(H) respectively indicate a data sequence in the former half, a data sequence in the center, and a data sequence in the latter half of a data sequence including several thousands of serial bits for monochrome BK. Hatched portions represent dummy data.

Then, the analog pre-stage processing unit 44 outputs the color data RGB and the monochrome data K(L) at a first negative edge of the image enable signal HDEN as shown in FIG. 15B.

At a second negative edge, the analog pre-stage processing unit 44 outputs color dummy data and the monochrome data K(C).

At a third negative edge, the analog pre-stage processing unit 44 outputs color dummy data and the monochrome data K(H).

The analog pre-stage processing unit 44 repeats the output of the color data RGB and the monochrome data K(L), the output of the color dummy data and the monochrome data K(C), and the output of the color dummy data and the monochrome data K(H) to output data. Thereafter, the signal processing device 14 executes processing such as shading correction and inter-line correction.

FIG. 16A is a time chart of image data before inter-line correction processing during normal reading. FIG. 16B is a time chart of image data after the inter-line correction processing during the normal reading.

The signal processing device 14 executes line delay. After the execution, as shown in FIG. 16B, the signal processing device 14 aligns, on the same line, image data on lines indicated by arrows in FIG. 16A.

Specifically, during the normal reading, the B pixels are shifted by twelve lines from the reference K pixels. The inter-line correction unit 49 executes the line delay such that the reference image data K(L) and image data (B-4) twelve lines before the reference image data K(L) are on the same line.

The B pixels and the G pixels are shifted from each other by sixed lines. The inter-line correction unit 49 executes the line delay such that the reference image data K(L) and image data (G-6) eighteen lines (twelve lines+six lines) before the reference image data K(L) are on the same line.

The G pixels and the R pixels are shifted from each other by six lines. The inter-line correction unit 49 executes the line delay such that the reference image data K(L) and image data (G-8) twenty-four lines (twelve lines+six lines+size lines) before the reference image data K(L) are on the same line.

On the other hand, in the case of 50% reduction reading, processing targets of the signal processing device 14 are as shown in FIG. 14B. Each of a line interval between the R pixels and the G pixel and a line interval between the G pixels and the B pixels are three lines. A line interval between the B pixels and the K pixels is six lines.

It is assumed that, as shown in FIG. 15A, the signal processing device 14 generates the sample hold signals SH-B/W, SH-R, SH-G, and SH-B at timing same as timing during the normal reading.

Figure 16C:
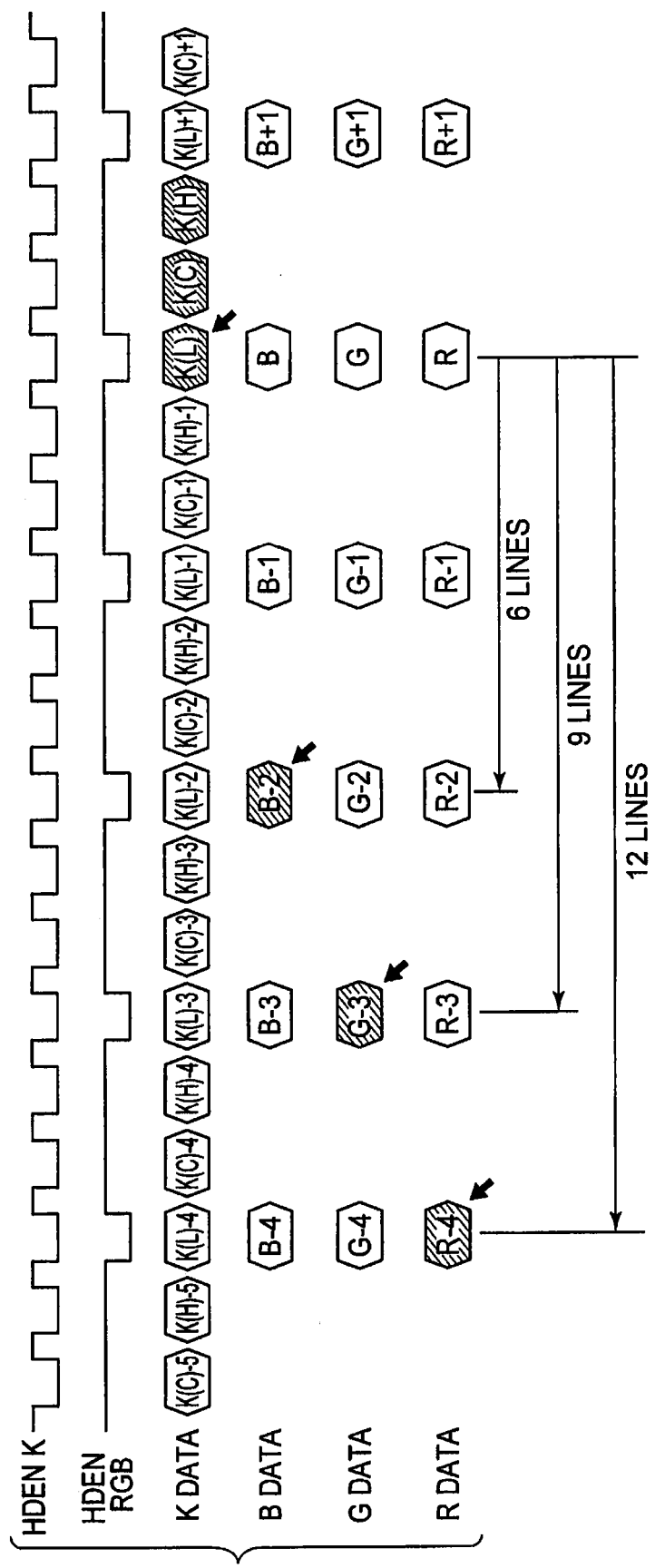
FIG. 16C is a time chart of image data before the inter-line correction processing during 50% reduction reading.

FIG. 16C is a time chart of image data before the inter-line correction processing during the 50% reduction reading.

An example in which the CCD sensor 58 is driven at normal reading timing (FIG. 15A) is shown in the figure. Image data on lines indicated by arrows represent data necessary for inter-line correction.

The inter-line correction unit 49 needs to execute the line delay such that B data six lines before K data, G data nine lines before the K data, and R data twelve lines before the K data are on the same line.

The signal processing device 14 generates the sample hold signals SH-B/W, SH-R, SH-G, and SH-B at timing same as timing during 100% reading.

However, in this case, as shown in FIG. 16C, data of all RGB necessary for the inter-line correction are present. At all hatched points indicated by arrows, data about to be corrected are present.

Therefore, in this example, the signal processing device 14 does not need to perform processing for changing timing of a sample hold signal or processing for executing the line delay.

(2-2) A CCD sensor in which line intervals between R and G, between G and B, and between B and K are 8-8-8

Figure 17A:
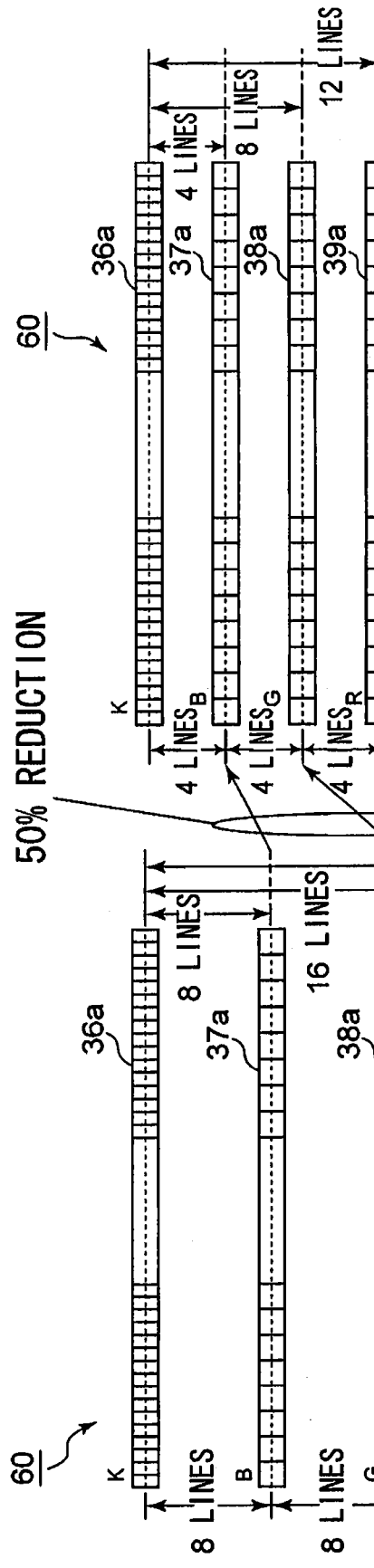
FIG. 17A is a diagram of a configuration example of a CCD sensor in which line intervals are 8-8-8.

FIG. 17A is a diagram of a configuration example of a CCD sensor in which line intervals are 8-8-8. All line intervals between R pixels and G pixels, between the G pixels and B pixels, and between the B pixels and K pixels are eight lines. Except for the intervals, the configuration of a CCD sensor 60 is substantially the same as the configuration of the CCD sensor 58.

Figure 17B:
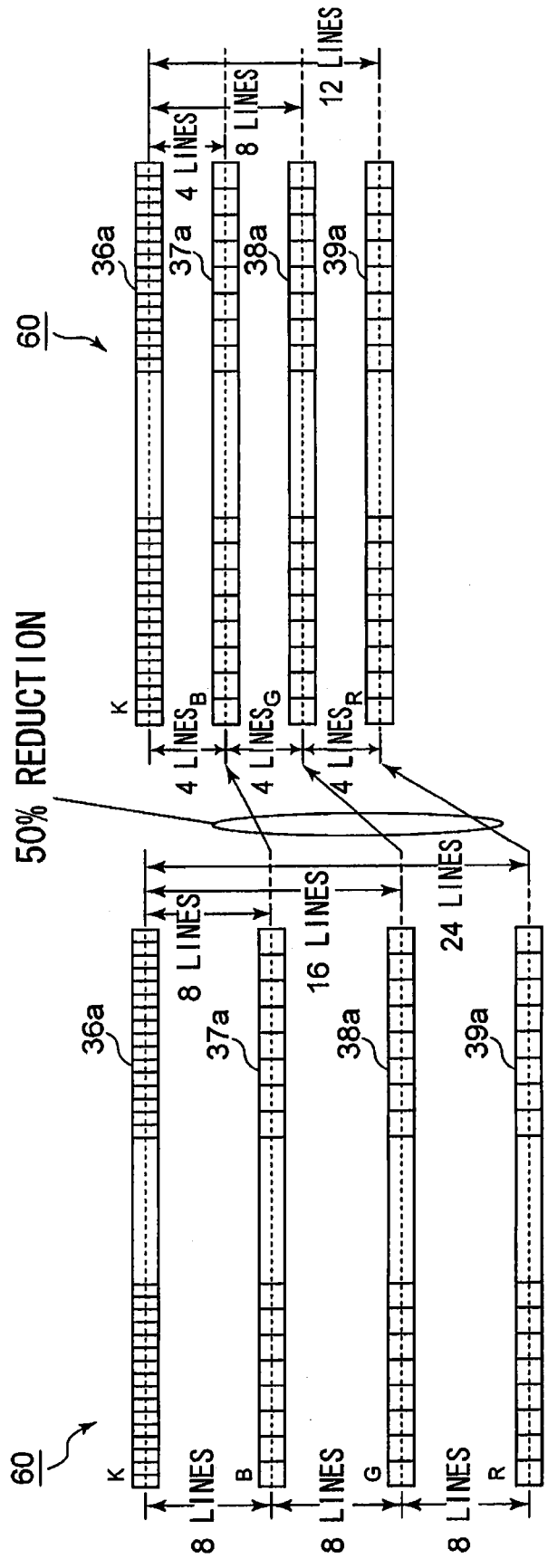
FIG. 17B is a diagram of intervals of four lines at a magnification 50% by the CCD sensor shown in FIG. 17A.

FIG. 17B is a diagram of intervals of four lines at a magnification 50% by the CCD sensor 60 shown in FIG. 17A. In FIGS. 17A and 17B, the reference numerals and signs already described above denote components same as the components denoted by the reference numerals and signs.

This case is an example in which, when the CCD sensor 60 and the analog pre-stage processing unit 44 are driven according to the sample hold signals SH-B/W, SH-R, SH-G, and SH-B shown in FIG. 15A, a problem is present even during normal reading.

The inter-line correction unit 49 drives the CCD sensor 60 and the analog pre-stage processing unit 44 according to the sample hold signals SH-B/W, SH-R, SH-G, and SH-B shown in FIG. 15A during the normal reading.

As shown in FIG. 15B, the analog pre-stage processing unit 44 outputs the color data RGB and the monochrome data K(L) at a first negative edge of the image enable signal HDEN. At a second negative edge, the analog pre-stage processing unit 44 outputs color dummy data and the monochrome data K(C). At a third negative edge, the analog pre-stage processing unit 44 outputs color dummy data and the monochrome data K(H).

The analog pre-stage processing unit 44 repeats the output of the color data RGB and the monochrome data K(L), the output of the color dummy data and the monochrome data K(C), and the output of the color dummy data and the monochrome data K(H) to output data.

It is assumed that, under a data array shown in FIG. 15B, the signal processing device 14 uses a mechanism for outputting data by repeating processing after the negative edges three times.

Figure 18A:
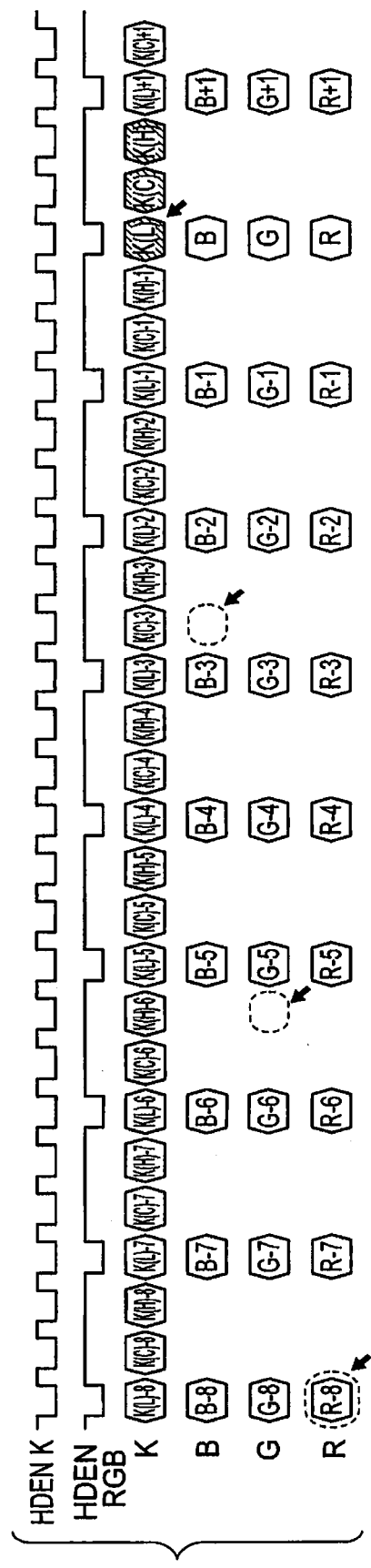
FIG. 18A is a time chart of image data before the inter-line correction processing during the normal reading.

FIG. 18A is a time chart of image data before inter-line correction processing during the normal reading. In the figure, an example in which the CCD sensor 60 is driven at normal reading timing (FIG. 15A) is shown. Image data on lines indicated by arrows represent data necessary for inter-line correction.

As targets after line delay by the inter-line correction unit 49, the following three data need to be on the same line:

B data eight lines before the reference image data K(L);

G data sixteen lines (eight lines+eight lines) before the reference image data K(L); and R data twenty-four lines (eight lines+eight lines+eight lines) before the reference image data K(L).

This is because the B pixels are shifted from the reference K pixels by eight lines, the G pixels and the B pixels are shifted from each other by eight lines, and the R pixels and the G pixels are shifted from each other by eight lines.

As shown in FIG. 18A, R data is present.

However, B data and G data that is to be read are not present on lines where correction is necessary. In the example shown in FIG. 18A, the signal processing device causes a state same as the 50% reduction reading explained in the other correction example above.

B data and G data necessary for the inter-line correction processing are not present as opposed to the targets after the line delay by the inter-line correction unit 49.

The signal processing device 14 uses other sample hold signals instead of the timing of the sample hold signals shown in FIG. 15A.

Figure 18B:
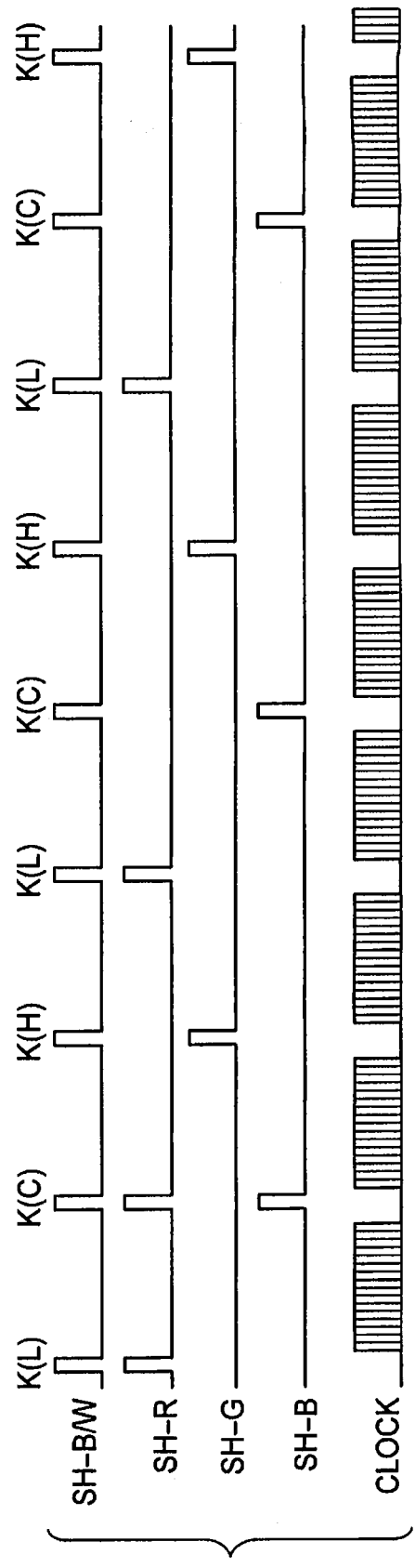
FIG. 18B is a time chart of the output I from a timing generator to the CCD sensor.

FIG. 18B is a time chart of the output I from the timing generator 41 to the CCD sensor 60. In the figure, an example in which the signal processing device 14 enables generation of data necessary for the inter-line correction during the normal reading is shown.

As shown in FIG. 18B, the timing generator 41 outputs the sample hold signal SH-R at timing same as timing of the sample hold signal SH-B/W of the monochrome data K(L).

The timing generator 41 outputs the sample hold signal SH-B at timing same as timing of the sample hold signal SH-B/W of the monochrome data K(C).

The timing generator 41 outputs the sample hold signal SH-B at timing same as timing of the sample hold signal SH-B/W of the monochrome data K(H).

Figure 18C:
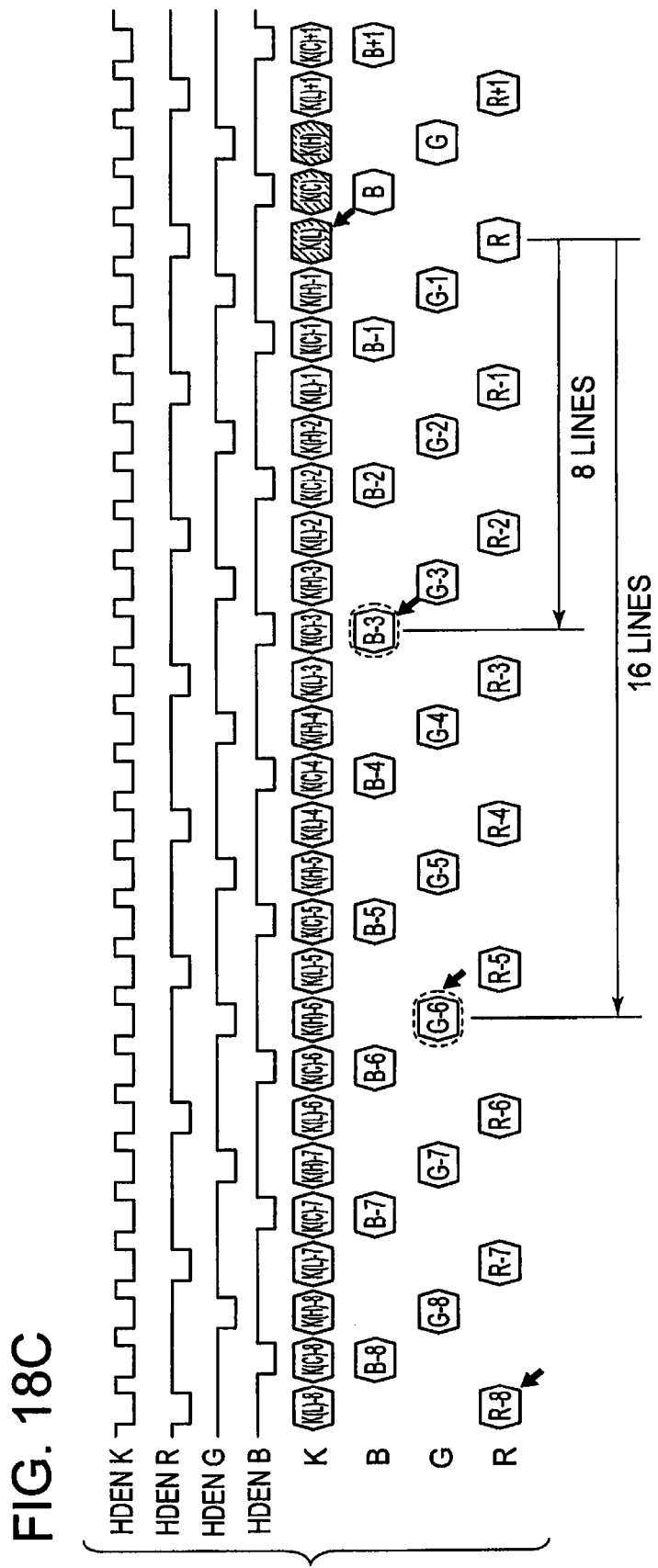
FIG. 18C is a time chart of image data before the inter-line correction processing during the normal reading.

In other words, the signal processing device 14 generates data necessary for the inter-line correction as shown in FIG. 18C.

FIG. 18C is a time chart of image data before the inter-line correction processing during the normal reading.

As shown in the figure, the signal processing device 14 generates B data and G data that are about to be subjected to line correction. The B data is data eight lines before the reference image data K(L). The G data is data sixteen lines before the reference image data K(L).

In this way, the signal processing device 14 generates the sample hold signals SH-R, SH-G, and SH-B of R, G, and B at timings different from one another. Consequently, the generation with the timing difference enables to prevent the problem that data necessary for the inter-line correction processing is not generated.

In the case of the 50% reduction reading, the signal processing device 14 executes the inter-line correction according to an example shown in FIG. 17B. In the figure, each of line intervals between the R pixels and the G pixels, between the G pixels and the B pixels, and the B pixels and the K pixels is four lines.

The inter-line correction unit 49 needs to execute the line delay such that B data four lines before reference K data, G data eight lines before the K data, and R data twelve lines before the K data are on the same line.

As in the example explained above, it is assumed that the signal processing device 14 generates the sample hold signals SH-B/W, SH-R, SH-G, and SH-B at the timing of the normal reading shown in FIG. 15A.

Figure 19A:
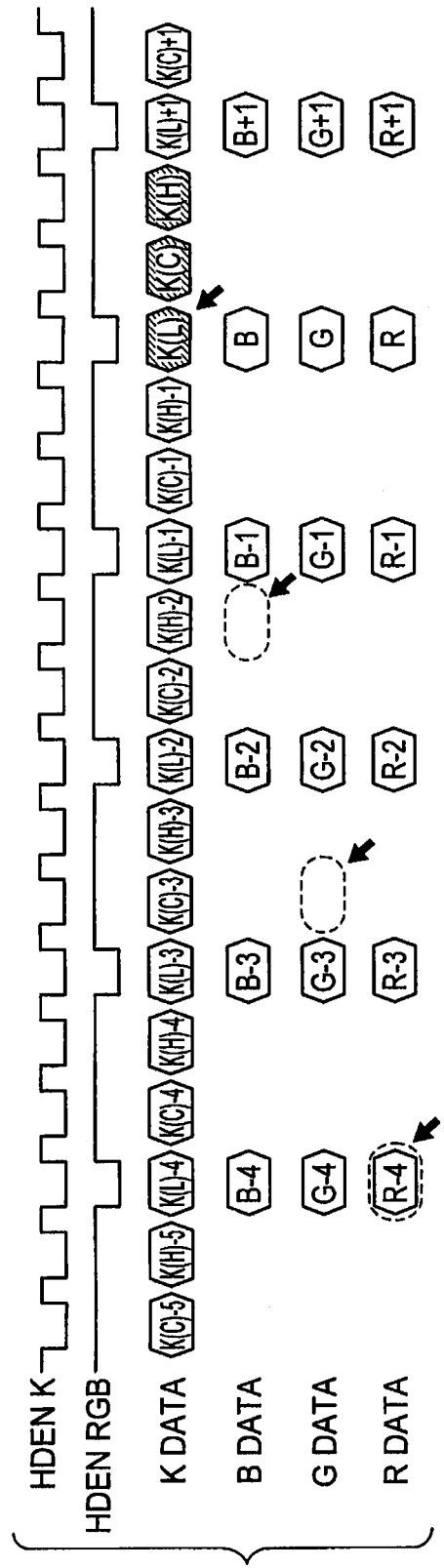
FIG. 19A is a time chart of image data before the inter-line correction processing during 50% reading.

FIG. 19A is a time chart of image data before the inter-line correction processing during 50% reading. In the figure, an example in which the CCD sensor 60 is driven at the timing of the normal reading is shown.

As shown in FIG. 19A, B data and G data necessary for the correction processing are not generated. Data are not present at points indicated by arrows.

The signal processing device 14 uses timing that replaces the timing shown in FIG. 15A.

Figure 19B:
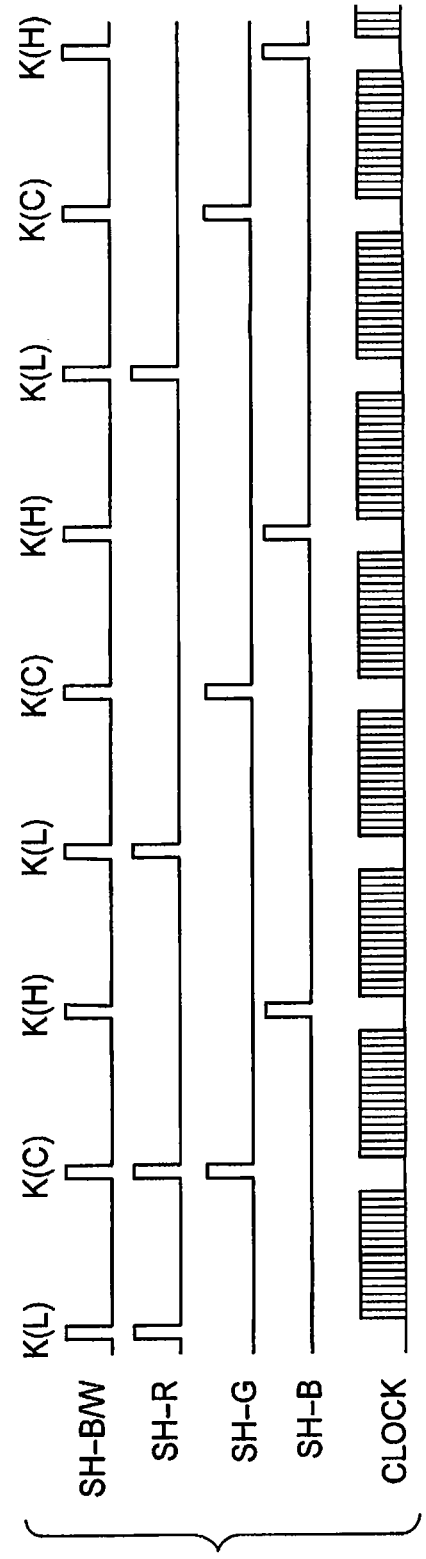
FIG. 19B is a time chart of the output I from the timing generator to the CCD sensor.

FIG. 19B is a time chart of the output I from the timing generator 41 to the CCD sensor 60. In the figure, an example during the 50% reduction reading is shown.

The timing generator 41 outputs the sample hold signal SH-R at timing same as timing of the sample hold signal SH-B/W of the monochrome data K(L).

The timing generator 41 outputs the sample hold signal SH-G at timing same as timing of the sample hold signal SH-B/W of the monochrome data K(C).

The timing generator 41 outputs the sample hold signal SH-B at timing same as timing of the sample hold signal SH-B/W of the monochrome data K(H).

FIG. 19C is a time chart of image data before the inter-line correction processing during the 50% reduction reading.

As shown in FIG. 19C, the signal processing device 14 generates B data for correction and G data for correction necessary for the inter-line correction. The B data is data four lines before the reference image data K(L). The G data is data eight lines before the reference image data K(L).

In an example shown in FIGS. 19A to 19C, as in the example explained above, the signal processing device 14 generates the sample hold signals SH-R, SH-G, and SH-B of R, G, and B at timings different from one another. Consequently, the generation with the timing difference enables to prevent the problem that data necessary for the inter-line correction processing is not generated.

However, if the processing explained above is performed, the shading correction unit 47 needs to control all the R data, the G data, and the B data at separate timings.

The signal processing device 14 causes the line delay unit 46 to execute the line delay at a pre-stage of the inter-line correction unit 49 and prevents execution of the control at the separate timings.

During the normal reading, the line delay unit 46 delays the G data by two lines and delays the B data by one line from a state shown in FIG. 18C.

During the 50% reading, the line delay unit 46 delays the G data by one line and delays the B data by two lines from a state shown in FIG. 19C. The line delay unit 46 sets timing of the G data and timing of the B data same as timing of the R data.

The line delay unit 46 additionally executes the line delay processing.

Figure 20A:
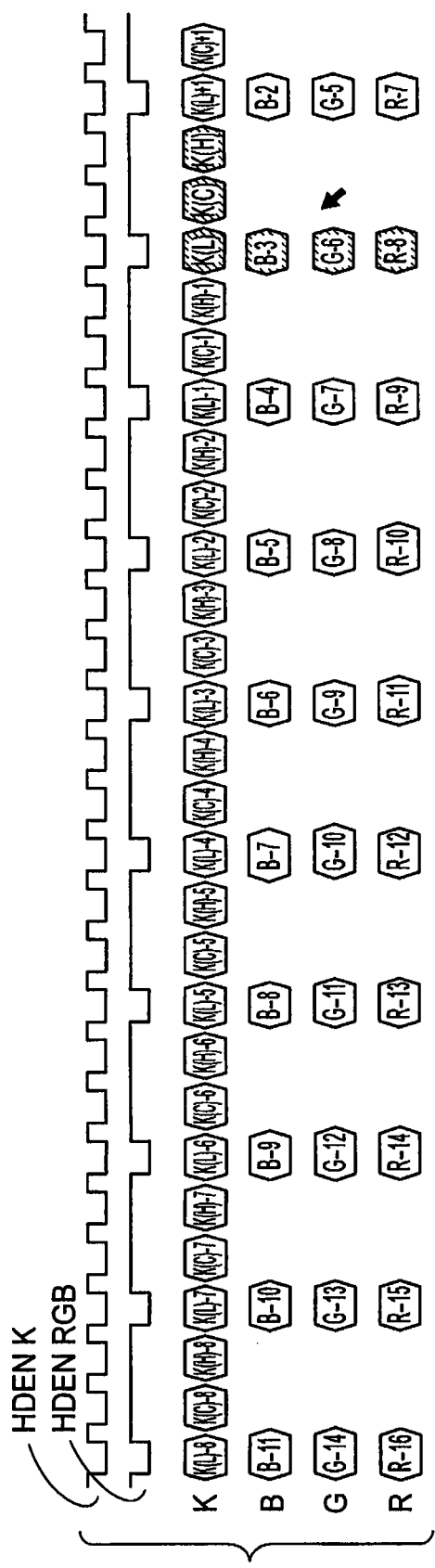
FIG. 20A is a time chart of image data after the inter-line correction processing during the normal reading.
Figure 20B:
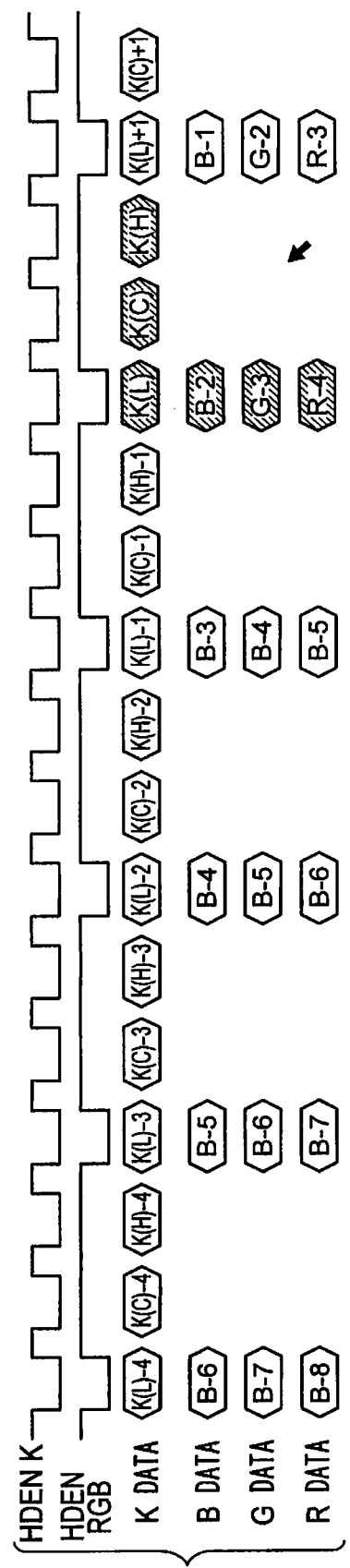
FIG. 20B is a time chart of image data after the inter-line correction processing during the 50% reduction reading.

FIG. 20A is a time chart of image data after the inter-line correction processing during the normal reading. FIG. 20B is a time chart of image data after the inter-line correction processing during the 50% reduction reading.

During the normal reading, the signal processing device 14 generates timing shown in FIG. 20A. During the 50% reduction reading, the signal processing device 14 generates timing shown in FIG. 20B. Consequently, all the RGB data are controlled at the same timing.

As a result, the signal processing device 14 can simultaneously process RGB. The signal processing device 14 does not need to perform additional processing for controlling respective timings.

During the normal reading, the inter-line correction unit 49 generates a state in which the G data is already delayed by two lines and the B data is already delayed by one line before the inter-line correction processing. During the normal reading, the signal processing device 14 delays the G data by fourteen lines and delays the B data by seven lines.

The "fourteen lines" indicates that two lines are subtracted from sixteen lines for a necessary delay. The "seven lines" indicates that one line is subtracted from eight lines for a necessary delay.

During the 50% reduction reading, the G data is already delayed by one line and the B data is already delayed by two lines before the inter-line correction processing.

The signal processing device 14 delays the G data by seven lines obtained by subtracting one line from eight lines for a necessary delay. The signal processing device 14 delays the B data by two lines obtained by subtracting two lines from four lines for a necessary delay.

In FIG. 1, after executing the line delay with the line delay unit 46, the signal processing device 14 can additionally process the shading correction unit 47. The signal processing device 14 can separately control the RGB data at timing same as timing of the inter-line correction during the 50% reduction reading.

In this way, if data is not present on lines necessary for correction in the inter-line correction processing, the signal processing device 14 separately changes the timings of the sample hold signals SH-B/W, SH-R, SH-G, and SH-B.

Since data is interpolated on lines necessary for the line correction, the K line sensor 36, the B line sensor 37, the G line sensor 38, and the R line sensor 39 having resolutions different from one another can be processed by substantially the same control.

Since the signal processing device 14 performs the line delay in advance, all the RGB data can be subjected to shading correction at the same timing and the inter-line correction processing can be performed even during the 50% reduction reading in the same manner as processing during 100% reading.

The first embodiment and the second embodiment are compared with a related art.

In an image reading apparatus according to the related art, if resolutions are different in monochrome and color three lines, control is complicated.

For example, if a four-line CCD sensor having line intervals 6-6-8 executes 50% reading, processing targets are image data at line intervals 3-3-4.

(a) The image reading apparatus according to the related art executes the 50% reading according to control same as control during 100% reading. The image reading apparatus cannot read RGBK data, all of which are in the same position. The image reading apparatus cannot read G data.

The image reading apparatus according to the related art reads the G data by shifting the phase of a pulse of a sample hold signal.

The image reading apparatus needs to generate the sample hold signal SH-G at timing different from timing of the sample hold signal SH-R and the sample hold signal SH-B.

(b) If shading correction processing is executed in a state of (a), the image reading apparatus according to the related art needs to generate different image enable signals for R and B and for G. The image reading apparatus according to the related art needs different image enable signals. The use of the different image enable signals complicates control.

In the scanner 13, since the signal processing device 14 prevents the complication of the control, all the image data of R, G, and B can be controlled according to the same image enable signal HDEN.

In the scanner 13 and the MFP 10, the G data is delayed by one line before shading correction to set the R and B data and the G data on the same line. A method of controlling a circuit of the four-line CCD sensor 30 or the like having different resolutions in monochrome and color three lines is executed. Consequently, the MFP 10 is operable to use, without complicated control, a hybrid four-line CCD sensor having resolutions different from one another.

Others

In the embodiment, the image forming apparatus is the MFP 10. However, the image forming apparatus may be a printer or a copying machine.

The arrangement and the configuration shown in FIG. 2A and waveforms shown in FIGS. 4A to 4F can be variously changed. The superiority of the embodiments is not spoiled at all over an embodiment that is merely carried out by changing the configuration and the waveforms.

A repetition period and pulse width of the transfer clocks φ1 and the like and the sample hold signals SH-B/W and the like can be variously changed in a range in which the gist of the image reading apparatus and method according to the embodiments is not changed. The superiority of the embodiments is not spoiled at all over an embodiment that is merely carried out by changing the repetition period and the pulse width.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image reading apparatus comprising:
a monochrome CCD sensor provided along a main scanning direction and including a first photo-diode array configured to photoelectrically convert a light image of reflected light reflected from a document surface;
plural color CCD sensors each provided along the main scanning direction at a physical interval apart from the monochrome CCD sensor in a sub-scanning direction and including a second photodiode array configured to photoelectrically convert the light image;
an AD converter configured to apply analog-to-digital conversion to each of analog outputs from the second photodiode array of each of the color CCD sensors and the first photodiode array of the monochrome CCD sensor;
a delay processing unit configured to delay at least one of color image data of plural colors output by the AD converter and interpolate, with delayed any one or more of the color image data, a blank of image data that is to be read on a line in the sub-scanning direction; and
an inter-line correction unit configured to correct, by the intervals and a set reduction magnification, a positional deviation in the sub-scanning direction between the monochrome image data and the color image data of the plural colors, respective timings of which are aligned on the line by the delay processing unit.

2. The apparatus of claim 1, further comprising a selecting unit configured to select, according to the reduction magnification, whether line delay by the delay processing unit is executed or the color image data of the plural colors are output without the line delay.

3. The apparatus of claim 2, wherein, if the intervals and the reduction magnification form a divisible combination and line intervals after reduction of the intervals at the reduction magnification are odd-number values, the selecting unit executes the line delay.

4. The apparatus of claim 1, wherein each of resolutions in the main scanning direction of the plural color CCD sensors is 1/X of resolution in the main scanning direction of the monochrome CCD sensor (X represents an arbitrary natural number).

5. The apparatus of claim 1, further comprising a clock generating unit configured to output a sample hold signal indicating a period in which charges by photoelectric conversion are accumulated and a transfer clock for serially transferring plural charge signals, each of which is accumulated according to the sample hold signals, wherein
the clock generating unit changes timing of a pulse appearing in the sample hold signal for the plural color CCD sensors and timing of another pulse appearing in the sample hold signal for the monochrome CCD sensor.

6. The apparatus of claim 1, further comprising a clock generating unit configured to output a sample hold signal indicating a period in which charges by photoelectric conversion are accumulated and a transfer clock for serially transferring plural charge signals, each of which is accumulated according to the sample hold signals, wherein
the clock generating unit controls, with respect to any one color image data for which a phase needs to be shifted among the color image data of the plural colors, timing of a pulse appearing in the sample hold signal for any one color CCD sensor corresponding to the one color image data among the plural color CCD sensors.

7. The apparatus of claim 6, wherein the clock generating unit controls the timing of the pulse to set an amount of the shift of the phase to 1 to Y−1 lines (Y represents an arbitrary natural number).

8. The apparatus of claim 1, further comprising:
a clock generating unit configured to output a sample hold signal indicating a period in which charges by photoelectric conversion are accumulated and a transfer clock for serially transferring plural charge signals, each of which is accumulated according to the sample hold signals; and a memory configured to store data, wherein
if a phase shift occurs in any one of the color image data of the plural colors, the delay processing unit reads out the color image data, in which the phase shift occurs, from the memory first, executes the line delay, and sets phases of the color image data of the plural colors to a same phase.

9. The apparatus of claim 1, further comprising a shading correction unit configured to subject the color image data of the plural colors and the monochrome image data to shading correction.

10. The apparatus of claim 1, further comprising a clock generating unit configured to output a sample hold signal indicating a period in which charges by photoelectric conversion are accumulated and a transfer clock for serially transferring plural charge signals, each of which is accumulated according to the sample hold signals, wherein
the monochrome CCD sensor includes a first analog shift register and each of the plural color CCD sensors includes a second analog shift register, and
the clock generating unit samples, with the sample hold signal, charges shifted according to the transfer clock and holds the charges in the analog shift registers.

11. An image forming apparatus comprising:
an optical system configured to scan a document surface in each of a main scanning direction and a sub-scanning direction orthogonal to the main scanning direction and generate a light image having size corresponding to a set reduction magnification;
a monochrome CCD sensor provided along the main scanning direction and including a first photo-diode array configured to photoelectrically convert the light image;
plural color CCD sensors each provided along the main scanning direction at a physical interval apart from the monochrome CCD sensor in the sub-scanning direction and including a second photodiode array configured to photoelectrically convert the light image;
an AD converter configured to apply analog-to-digital conversion to each of analog outputs from the second photodiode array of each of the color CCD sensors and the first photodiode array of the monochrome CCD sensor;
a delay processing unit configured to delay at least one of color image data of plural colors output by the AD converter and interpolate, with delayed any one or more of the color image data, a blank of image data that is to be read on a line in the sub-scanning direction;
an inter-line correction unit configured to correct, at intervals and the reduction magnification, a positional deviation in the sub-scanning direction between the monochrome image data and the color image data of the plural colors, respective timings of which are aligned on the line by the delay processing unit; and
an image forming unit configured to form an image having size corresponding to the reduction magnification according to an output from the inter-line correction unit.

12. The apparatus of claim 11, further comprising a selecting unit configured to select, according to the reduction magnification, whether line delay by the delay processing unit is executed or the color image data of the plural colors are output without the line delay.

13. The apparatus of claim 12, wherein, if the intervals and the reduction magnification form a divisible combination and line intervals after reduction of the intervals at the reduction magnification are odd-number values, the selecting unit executes the line delay.

14. The apparatus of claim 11, further comprising a clock generating unit configured to output a sample hold signal indicating a period in which charges by photoelectric conversion are accumulated and a transfer clock for serially transferring plural charge signals, each of which is accumulated according to the sample hold signals, wherein
the clock generating unit changes timing of a pulse appearing in the sample hold signal for the plural color CCD sensors and timing of another pulse appearing in the sample hold signal for the monochrome CCD sensor.

15. The apparatus of claim 11, further comprising a clock generating unit configured to output a sample hold signal indicating a period in which charges by photoelectric conversion are accumulated and a transfer clock for serially transferring plural charge signals, each of which is accumulated according to the sample hold signals, wherein
the clock generating unit controls, with respect to any one color image data for which a phase needs to be shifted among the color image data of the plural colors, timing of a pulse appearing in the sample hold signal for any one color CCD sensor corresponding to the one color image data among the plural color CCD sensors.

16. The apparatus of claim 15, wherein the clock generating unit controls the timing of the pulse to set an amount of the shift of the phase to 1 to Y−1 lines (Y represents an arbitrary natural number).

17. The apparatus of claim 11, further comprising:
a clock generating unit configured to output a sample hold signal indicating a period in which charges by photoelectric conversion are accumulated and a transfer clock for serially transferring plural charge signals, each of which is accumulated according to the sample hold signals; and
a memory configured to store data, wherein
if a phase shift occurs in any one of the color image data of the plural colors, the delay processing unit reads out the color image data, in which the phase shift occurs, from the memory first, executes the line delay, and sets phases of the color image data of the plural colors to a same phase.

18. The apparatus of claim 11, further comprising a shading correction unit configured to subject the color image data of the plural colors and the monochrome image data to shading correction.

19. An image reading method comprising:
determining, according to a physical interval in a sub-scanning direction between a monochrome CCD sensor and each of plural color CCD sensors and a set reduction magnification, whether a line interval having an odd-number value is formed;
executing normal reduction processing if a determination result is negative and generating, with the monochrome CCD sensor and the plural color CCD sensors, color image data of plural colors and monochrome image data from a document surface; and
executing line delay if the determination result is affirmative, delaying at least one of the color image data of the plural colors, and interpolating, with delayed any one or more of the color image data, a blank of image data that is to be read on a line in the sub-scanning direction.

20. The method of claim 19, wherein, if the intervals and the reduction magnification form a divisible combination and line intervals after reduction of the interval at the reduction magnification are odd-number values, the line delay is executed.

* * * * *